United States Patent
Tenny

(10) Patent No.: US 8,526,419 B2
(45) Date of Patent: Sep. 3, 2013

(54) PROVISION OF INTER-FREQUENCY SUBFRAME CONFIGURATION IN WIRELESS COMMUNICATION

(75) Inventor: Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 468 days.

(21) Appl. No.: 12/651,964

(22) Filed: Jan. 4, 2010

(65) Prior Publication Data

US 2010/0172272 A1    Jul. 8, 2010

Related U.S. Application Data

(60) Provisional application No. 61/142,574, filed on Jan. 5, 2009.

(51) Int. Cl.
   *H04J 3/06*    (2006.01)

(52) U.S. Cl.
   USPC .......................................................... 370/350

(58) Field of Classification Search
   USPC ................. 370/312–314, 328–339, 347–350, 370/503, 509–510
   See application file for complete search history.

(56) References Cited

U.S. PATENT DOCUMENTS

| 7,167,717 | B1 | 1/2007 | Goren |
| 7,436,813 | B2 | 10/2008 | Kim et al. |
| 2006/0009246 | A1 | 1/2006 | Marinier et al. |
| 2006/0034250 | A1 | 2/2006 | Kim et al. |

FOREIGN PATENT DOCUMENTS

| CN | 101044768 A | 9/2007 |
| CN | 101237655 A | 8/2008 |
| JP | 2002524967 A | 8/2002 |
| JP | 2008506335 A | 2/2008 |
| WO | WO0014907 | 3/2000 |
| WO | 2005088886 A1 | 9/2005 |
| WO | 2006017024 A2 | 2/2006 |
| WO | 2008127185 A1 | 10/2008 |

OTHER PUBLICATIONS

3GPP TS 25.123 V3.14.0, 3rd Generation Partnership Project; Technical Specification Group Radio Access Network; Requirements for support of radio resource management (TDD) (Release 1999), 123 pages, 2003.*

(Continued)

*Primary Examiner* — Frank Duong

(57) ABSTRACT

Providing for inter-frequency timing provision in wireless communication is disclosed herein. By way of example, cells of a wireless network can be configured to acquire information pertaining to subframe timing configurations employed by nearby wireless cells, including cells that employ a different frequency as an acquiring cell. The subframe timing configuration can be forwarded to access terminals served by the acquiring cell, to facilitate proper reception of neighboring signals, including on the different frequency. Various formats are disclosed herein for conveying subframe timing configurations, including a single bit format and multiple bit formats, which can specify various ranges of timing information in relation to a known timing, or can specify a complete subframe timing configuration for one or more such cells.

50 Claims, 16 Drawing Sheets

(56) References Cited

OTHER PUBLICATIONS

3GPP TS 25.402 v8.0.0: "3rd Generation Partnership Project; Technical Specification Group Radio Access Network; Synchronisation in UTRAN Stage 2 (Release 8)" 3rd Generation Partnership Project (3GPP), Sophia-Antipolis Cedex, France, (Dec. 1, 2008), pp. 1-51, XP050368154, paragraph 6.1.2.1, paragraph 6.1.2.2, paragraph 8.2.2.
3GPP TS 25.423 v8.3.0: "Technical Specification Group Radio Access Network; UTRAN Iur interface RNSAP signalling (Release 8)," 3rd Generation Partnership Project (3GPP), Valbonne, France, (Dec. 1, 2008), XP050368561, paragraph 9.2.1.9, paragraph 9.2.1.30, paragraph 9.2.1.41D, paragraph 9.2.1.54, paragraph 9.2.1.56, paragraph 9.2.1.66.
International Search Report—PCT/US2010/020150, International Search Authority—European Patent Office—Apr. 28, 2010.
Ericsson, "Results for IF TDD RSRP Requirements," 3GGP TSG-RAN4#47, R4-080957, May 2008.
"Written Opinion—PCT/US2010/020150—ISA/EPO—Jul. 5, 2010".

\* cited by examiner

PROVISION OF INTER-FREQUENCY SUBFRAME CONFIGURATION IN WIRELESS COMMUNICATION

CROSS-REFERENCE

This application claims the benefit of U.S. Provisional Application Ser. No. 61/142,574, filed Jan. 5, 2009, and entitled "NEIGHBOR CELL TDD CONFIGURATION FOR INTER-FREQUENCY CASES," the entirety of which is incorporated herein by reference.

BACKGROUND

1. Field

The following description relates generally to wireless communications, and more particularly to facilitating inter-frequency timing acquisition for neighboring cells of a wireless network.

2. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

For wireless communication in general, and particularly wireless systems employing a time division duplex (TDD) multiplexing technology, signal timing is an important aspect of successful transmission and reception of data. Wireless signals are generally divided in time into multiple time frames, comprising multiple time subframes. In TDD, time frames can be designated for uplink (UL) transmission or downlink (DL) transmission. This provides an overt mechanism for turn-based wireless transmission and reception to mitigate interference. Furthermore, accurate timing is an important part of successfully demapping and demodulating a wireless signal; without knowing what symbols to expect at a particular time, proper wireless reception can be difficult or impossible, depending on circumstances.

In a typical wireless mechanism, a wireless receiver can analyze received pilot signals of wireless base stations to establish a baseline signal timing configuration, among other things. This signal timing configuration can comprise, for instance, duration of signal frames and subframes, and start and stop times thereof. This measurement can be processor intensive, however, particularly when in range of a number of transmitters and where receiving a number of pilot signals. Particularly for mobile devices, unconnected to permanent source of electrical power, minimizing processing overhead and power consumption is a persistent goal, to extend battery life.

Upon entering a new network, a wireless receiver typically must perform timing analysis of at least one base station or network access point to initiate control communications therewith. Some exceptions may exist (e.g., where the terminal is in a known location and is preconfigured with a timing configuration for base stations within that location), but for cellular networks and many other wireless networks, this is a common procedure. Once initial timing and acquisition is achieved with one base station (e.g., a serving base station), the access terminal can continue to employ the timing configuration for communication with the serving base station as well as neighboring base stations utilizing the same timing configuration. However, where different timing configurations are employed among neighboring base stations, further processing may be required to hand off to, or otherwise decode signals of the neighboring base stations. Particularly when mobile (e.g., driving in a car), moving from one network cell to another can add significant processing overheard as network timing is acquired from one cell to another.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the subject disclosure in a simplified form as a prelude to the more detailed description that is presented later.

The subject disclosure provides for inter-frequency timing provision in wireless communication. Cells of a wireless network can be configured to acquire information pertaining to subframe timing configurations employed by nearby wireless cells, including cells that employ a different frequency as an acquiring cell. The subframe timing configuration can be forwarded to access terminals served by the acquiring cell, to facilitate proper reception of neighboring signals, including on the different frequency. Various formats are disclosed herein for conveying subframe timing configurations, including a single bit format that compares the neighboring cell's timing configuration to the acquiring cell's timing configuration, to multiple bit formats that specify a range of relational information for the neighboring cell's timing configuration, or that explicitly specify a complete subframe configuration for such cell.

According to further aspects of the subject disclosure, an access terminal receiving an IE as provided herein can analyze the message in conjunction with obtaining a subframe timing configuration for a non-serving frequency. Based on information contained in the IE, the access terminal can respond accordingly. For instance, if the subframe timing configuration is specified or implied by the IE, the access terminal can simply employ the specified/imputed configuration, and avoid timing measurements on the non-serving frequency. Where a relationship between timing configurations is employed by different cells of the non-serving frequency, the access terminal can employ one or more timing measurements and impute results thereof to other such cells.

Where no timing relationship or specification is provided, the access terminal can default to independently measuring respective cells.

According to further aspects of the subject disclosure, provided is a method of wireless communication. The method can comprise employing a communication interface to obtain a time division duplex (TDD) timing configuration for an access point of a wireless network on a first TDD frequency. Further, the method can comprise employing a data processor to execute instructions configured to provide inter-frequency TDD timing data via a serving cell of the wireless network on a second TDD frequency. Particularly, the instructions include establishing an information element (IE) comprising one or more message fields that specify information about the TDD timing configuration and forwarding the IE on a wireless air interface utilizing the second TDD frequency for delivery to one or more access terminals.

In still other aspects, provided is an apparatus for wireless communication. The apparatus can comprise a communication interface that obtains subframe timing information employed by an inter-frequency cell in a wireless network. Moreover, the apparatus can comprise a data processor for executing modules configured to update an access terminal with network timing. These modules can include a conversion module that generates an IE comprising one or more message fields for including information about the subframe timing information. Additionally, the modules can include a distribution module for sending the IE over an air interface to the access terminal by way of a wireless transmitter employed by the apparatus. Further to the above, the apparatus can comprise memory for storing the modules.

In additional aspects, an apparatus configured for wireless communication is provided. The apparatus can comprise means for employing a communication interface to obtain a TDD timing configuration for an access point of a wireless network on a first TDD frequency. Additionally, the apparatus can comprise means for employing a data processor to execute program modules configured to provide inter-frequency TDD timing data via a serving cell of the wireless network on a second TDD frequency. Specifically, these program modules can comprise means for establishing an IE comprising a set of message fields that specifies information about the TDD timing configuration and means for forwarding the IE utilizing the second TDD frequency to an access terminal within the serving cell.

Further to the above, disclosed is at least one processor configured for wireless communication. The processor(s) can comprise a module that obtains a TDD timing configuration for an access point of a wireless network on a first TDD frequency. Further, the processor(s) can comprise a module that establishes an IE comprising a set of message fields that specifies information about the TDD timing configuration. In addition to the foregoing, the processor(s) can comprise a module that forwards the IE to an access terminal within a serving cell of the wireless network on a second TDD frequency.

In another aspect, the subject disclosure provides a computer program product comprising a computer-readable medium. The computer-readable medium can comprise code for causing a computer to obtain a TDD timing configuration for an access point of a wireless network on a first TDD frequency. Furthermore, the computer-readable medium can comprise code for causing the computer to establish an IE comprising a set of message fields that specifies information about the TDD timing configuration. The computer-readable medium can also comprise code for causing the computer to forward the IE to an access terminal within a serving cell of the wireless network on a second TDD frequency.

According to other aspects of the subject disclosure, provided is a method of engaging in wireless communications. The method can comprise employing a wireless communication interface to obtain timing information pertaining to multiple frequencies of a wireless network. In addition, the method can comprise employing a data processor to execute instructions configured to determine inter-frequency timing data for cells of the wireless network. Particularly, the instructions can comprise parsing the timing information to identify timing data pertaining to a non-serving cell of the wireless network and analyzing the timing data to obtain or infer a subframe configuration of the non-serving cell.

In another aspect, an apparatus configured for engaging in wireless communication is disclosed herein. The apparatus can comprise a wireless communication interface that employs multiple TDD frequencies of a wireless network to communicate with multiple cells of the wireless network. Moreover, the apparatus can comprise memory for storing modules configured to obtain network timing configurations and at least one data processor to execute the modules. These modules can comprise an analysis module that inspects timing data obtained by the wireless communication interface from a serving cell of the wireless network to identify subframe configuration data pertaining to a non-serving frequency of the wireless network. Further, the modules can comprise an implementation module that employs a subframe configuration utilized by network cells on the non-serving frequency for analyzing signals thereof.

In yet another aspect, disclosed is an apparatus for participating in wireless communication. The apparatus can comprise means for employing a wireless communication interface to obtain timing information pertaining to a non-serving frequency of a wireless network. Further, the apparatus can comprise means for employing a data processor to execute program modules configured to determine inter-frequency timing data for cells of the wireless network. In addition, the program modules can comprise means for inspecting the timing information to identify subframe configuration data pertaining to the non-serving frequency and means for employing a subframe configuration utilized by network cells on the non-serving frequency for analyzing signals thereof.

In still other aspects, provided is at least one processor for participating in wireless communication. The processor(s) can comprise a module for obtaining timing information pertaining to a non-serving frequency of a wireless network. Moreover, the processor(s) can comprise a module for inspecting the timing information to identify subframe configuration data pertaining to the non-serving frequency. Further to the above, the processor(s) can comprise a module for employing a subframe configuration utilized by network cells on the non-serving frequency for analyzing signals thereof.

According to at least one further aspect, the subject disclosure describes a computer program product comprising a computer-readable medium. The computer-readable medium can comprise code for causing a computer to obtain timing information pertaining to a non-serving frequency of a wireless network. Moreover, the computer-readable medium can comprise code for causing the computer to inspect the timing information to identify subframe configuration data pertaining to the non-serving frequency. In addition to the foregoing, the computer-readable medium can comprise code for causing the computer to employ a subframe configuration utilized by network cells on the non-serving frequency for analyzing signals thereof.

DETAILED DESCRIPTION

Figure 1:
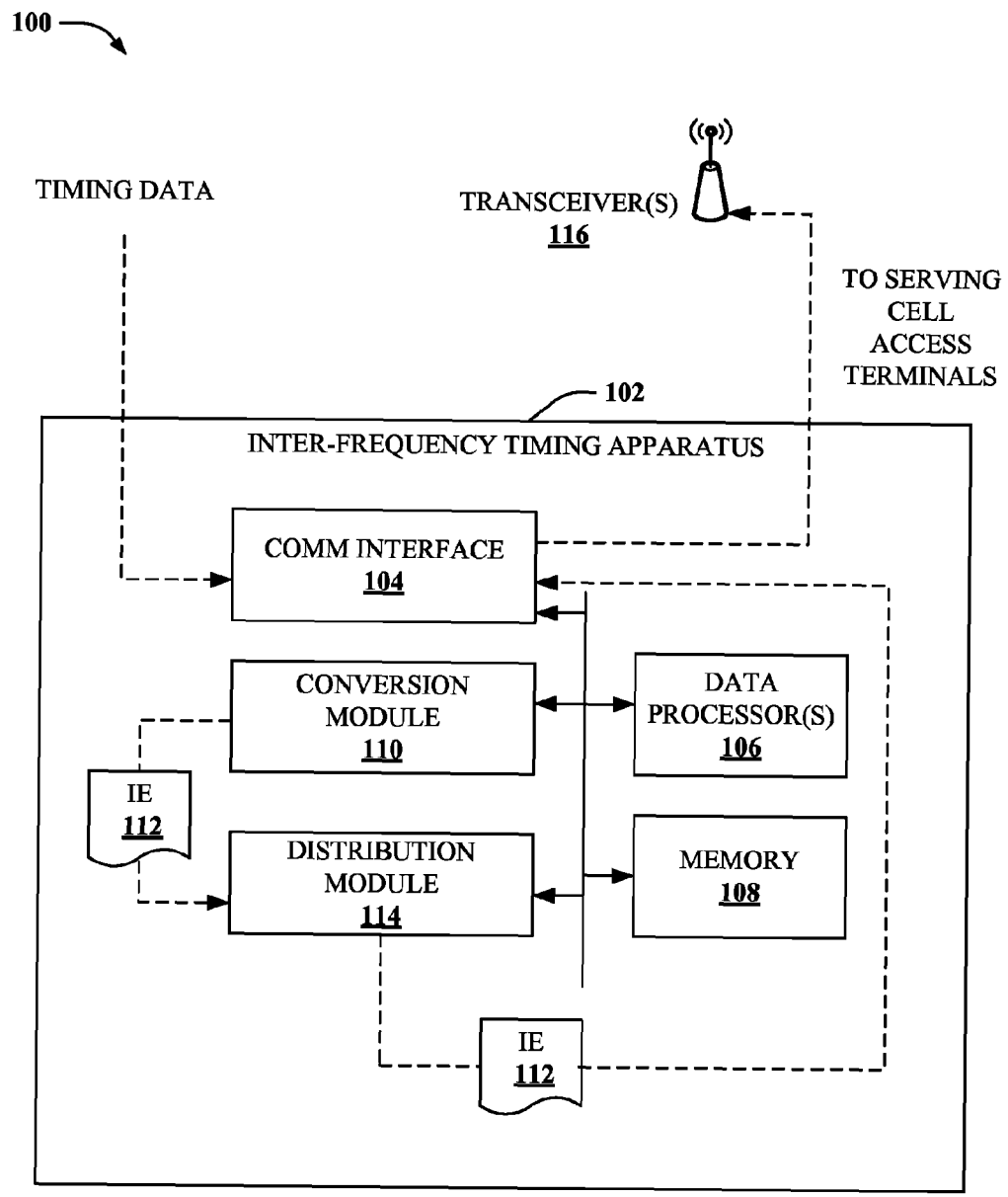
FIG. 1 illustrates a block diagram of an example inter-frequency timing apparatus according to aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of acquiring inter-frequency timing configurations in a multi-frequency wireless environment. One skilled in the art should appreciate that similar techniques could apply to other communication environments.

Wireless communication systems achieve electronic communication between remotely located wireless nodes through local infrastructure deployments and central networks that communicatively couple local infrastructure (e.g., a base station). In general, the local infrastructure can utilize various principles to exchange wireless information with these nodes. But each case depends on establishing a wireless link between a transmitter of the wireless node and a receiver of the local infrastructure or base station, and vice versa. Typically, the wireless link involves a transmitter-receiver pair coordinating a set of orthogonal wireless resources (e.g., frequency subband, time subslot, code-spread factor, and so on), employed by the wireless node and local infrastructure. By transmitting or decoding signals only on the set of orthogonal wireless resources, data transmitted on one wireless link (set of resources employed by a transmitter-receiver pair) can be distinguished from data transmitted on other wireless links (sets of resources employed by other transmitter-receiver pairs). Furthermore, each transmitter-receiver pair employing a distinct wireless link forms a distinct spatial channel, also referred to as a wireless channel, or signal dimension.

Timing acquisition is one aspect of receiving and properly processing wireless transmitted information. A wireless receiver typically employs a known subframe timing configuration in order to demap and demodulate wireless signals obtained by an antenna. Where necessary, hardware or software associated with the wireless receiver can analyze transmitted pilot signals to obtain basic timing configurations. This basic timing configuration enables a device to form a wireless link with a transmitting device, and obtain further details pertaining to facilitate wireless communication (e.g., scheduling information, resource partitioning information, uplink and downlink timing, and so on).

In a wireless network, neighboring cells or base stations can employ different subframe timing configurations. Furthermore, for time division duplex (TDD) wireless systems, the neighboring cells can also employ different frequency bandwidths for respective wireless signals. In conventional systems, timing information of neighboring cells on a common frequency might be provided to access terminals served by a particular cell. However, for neighboring cells on different frequencies, no such provisioning is provided. Accordingly, an access terminal would be required to perform independent timing analysis for cells on each frequency. This requirement leads to additional processing overhead for the access terminal, increasing power consumption and lowering battery life. In some aspects of the subject disclosure, inter-frequency timing information is provided by network cells to alleviate at least some of the processing overhead. In other aspects, the inter-frequency timing information is configured to limit changes to existing wireless standards (e.g., third generation partnership project [3GPP] long term evolution [LTE] TDD standards). In yet other aspects, additional logic is provided for access terminals to interpret the inter-frequency timing information while mitigating a need to perform independent measurements of various inter-frequency cells.

Turning now to the figures, FIG. 1 illustrates a block diagram of an example system 100 that provides timing information for inter-frequency cells of a wireless network. As utilized herein, the term inter-frequency cell refers to a cell of a wireless network that employs a different frequency than a cell serving a particular access terminal. In at least some aspects, system 100 can be implemented as part of a network base station. In other aspects, system 100 can be implemented as part of a wireless repeater or relay station. According to at least one other aspect, system 100 can be implemented in conjunction with a centralized base station controller (BSC), to manage timing provisioning for multiple cells of the wireless network at a central location.

System 100 comprises an inter-frequency timing apparatus 102, coupled with one or more wireless transceivers 116. Wireless transceiver(s) 116 can comprise a transmit and receive chain of a base station, repeater or relay, as one particular example. As another example, wireless transceiver(s) 116 can be directly coupled to inter-frequency timing apparatus 102, and be separate from such base station, repeater or relay. In either case, wireless transceiver(s) 116 is operative to transmit and receive wireless signals which are obtained from or provided to a communication interface 104 of inter-frequency timing apparatus 102, respectively. Received signals can be processed by communication interface 104 and stored in memory 108. Particularly, this processing can comprise signal filtering, symbol demapping and demodulation, or a suitable combination thereof (e.g., see FIG. 14, infra).

Although not depicted, communication interface 104 can also be coupled to a backhaul communication network linking one or more network cells (e.g., base stations, relays, repeaters, or the like). For instance, this backhaul network can be a wired electronic communication network or a wireless electronic communication network (e.g., involving wireless transceiver(s) 116) communicatively coupling one or more wireless network cells (e.g., a base station or serving cell coupled to inter-frequency timing apparatus 102 and an inter-frequency cell). By way of the backhaul communication network, communication interface 104 can acquire timing configuration information from the inter-frequency cell. Further, communication interface 104 can employ the wireless backhaul to convey timing information employed by the base station to such cell.

In the case of a central control implementation, any one of a set of network cells associated with inter-frequency timing apparatus 102 can be designated as the serving cell, whereas other network cells utilizing a different wireless frequency or bandwidth as the serving network cell are designated inter-frequency cells. Network cells employing the same frequency or bandwidth as the serving network cells are termed intra-frequency cells. According to an alternate aspect, designation of serving network cell can refer to a current cell for which timing information provisioning as described herein is currently being processed by inter-frequency timing apparatus 102 (e.g., for a particular access terminal). In this latter case, those cells providing the timing information are referred to as non-serving network cells. This designation can then be changed for additional processing of other such cells, as suitable.

In at least one particular aspect, communication interface 104 obtains subframe timing information employed by an inter-frequency cell in a wireless network. In this case, the inter-frequency cell employs a first TDD frequency and the serving cell employs a second TDD frequency, where the first and second TDD frequencies are different. Once obtained, this subframe timing information can be processed by communication interface 104 and stored in memory 108 (or optionally provided directly to one or more data processors 106 for additional processing). Data processor(s) 106 are provided for executing modules configured to update an access terminal (not depicted) with network timing of network cells on a non-serving frequency (e.g., the first TDD frequency or another TDD frequency, different from the second TDD frequency). Particularly, the modules can comprise a conversion module 110 that generates an information element (IE) 112 including information about the subframe timing configuration. Furthermore, the modules can comprise a distribution module 114 for sending IE 112 to the access terminal by way of a wireless transmitter employed by inter-frequency timing apparatus 102 (e.g., wireless transceivers 116).

As utilized herein, the term IE refers to a component of a wireless message. Thus, the IE can also be referred to as a message containing an IE. Particularly, the IE can comprise a set of message fields for conveying information. The type of information conveyed is described in more detail at various points in the subject disclosure.

According to particular aspects of the subject disclosure, IE 112 can be of one or more different formats, conveying various information about a subframe timing configuration of the inter-frequency cell. In one aspect, the IE is in a single-bit format that conveys useful timing information with minimal changes to conventional wireless standards. In other aspects, the IE is in a multi-bit format that conveys more detailed information, but with additional such changes. For the single-bit format, IE 112 indicates that the subframe timing configuration is the same as or different from a serving subframe timing configuration employed by the serving cell associated with the access terminal. In such case, the access terminal can receive and analyze IE 112, and determine whether the inter-frequency cell employs the same or a different subframe timing configuration based on the analysis. If the same subframe timing configuration is employed, the access terminal can avoid independently measuring the timing of the inter-frequency cell. Otherwise, the subframe timing configuration is measured. For the single-bit format, at least some access terminal timing measurements can be obviated.

For the multi-bit format, IE 112 can be configured to provide different granularity of information about the subframe timing configuration of the inter-frequency cell. In at least one aspect, the multi-bit format can be configured to specify a complete subframe timing configuration employed by the inter-frequency cell. In this aspect, the access terminal can avoid timing measurements altogether, at least for the particular inter-frequency cell. This aspect involves the greatest departure from prior standards. In another aspect, the multi-bit format can be configured to indicate any one of the following three relationships between the inter-frequency cell and the serving cell's timing configurations (where the inter-frequency cell employs the first TDD frequency and the serving cell employs the second TDD frequency): first, that cells of the wireless network employing the first TDD frequency utilize a serving subframe configuration of the serving cell, second, that cells of the wireless network employing the first TDD frequency utilize a common subframe configuration, which is different from the serving subframe configuration, or third, that cells of the wireless network employing the first TDD frequency also employ one of various subframe configurations. If IE 112 specifies the first relationship, the access terminal can utilize the subframe configuration of the serving cell and avoid additional timing measurements. If IE 112 specifies the second relationship, the access terminal can perform a single measurement to acquire the subframe timing configuration of the inter-frequency cell, and impute that timing configuration to all other network cells on that frequency. For the third relationship, the access terminal independently measures subframe timing configuration information for each cell of the non-serving frequency. For the first two relationships, however, some or all timing measurements can be avoided, reducing average processing and power consumption for an access terminal operating in a multi-frequency wireless network.

Figure 2:
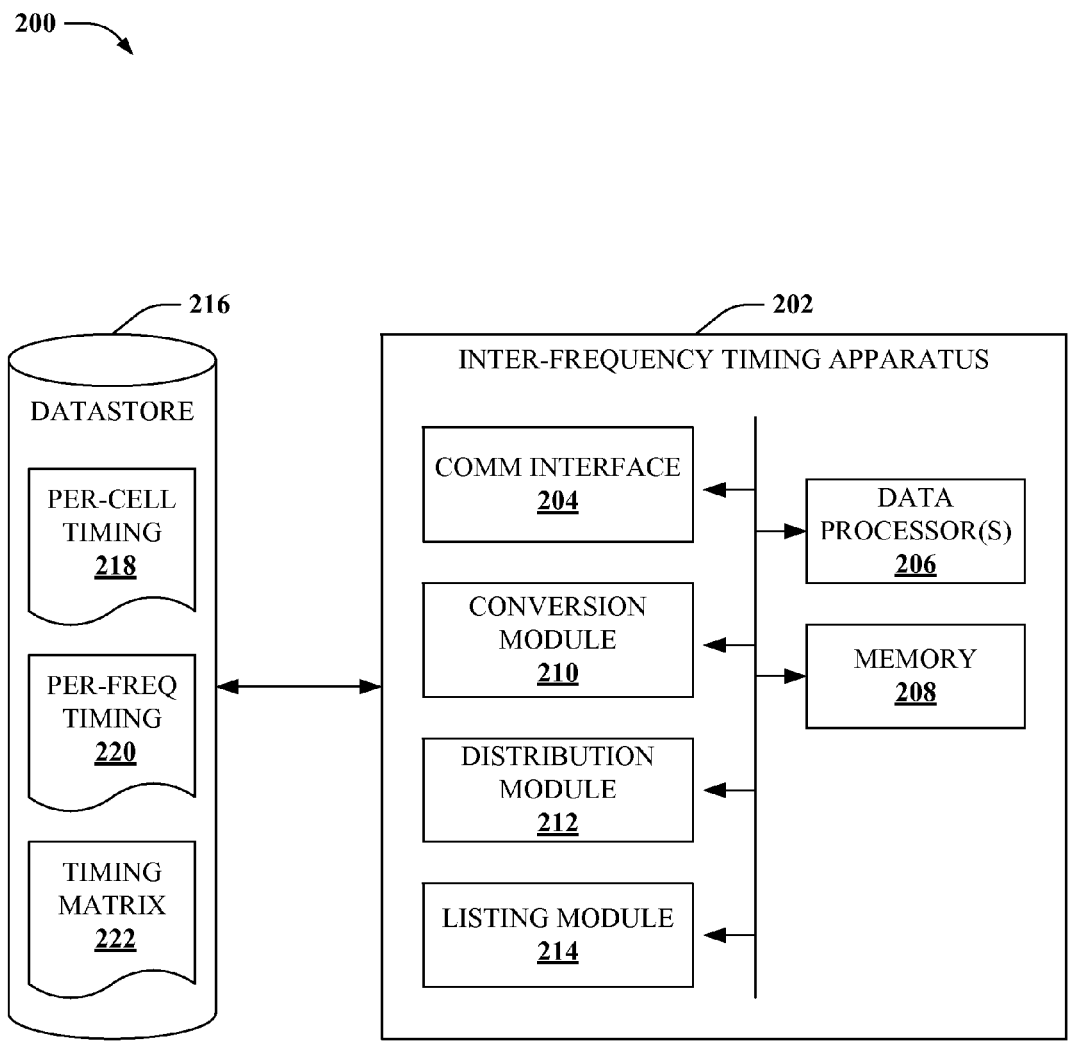
FIG. 2 depicts a block diagram of a sample inter-frequency timing apparatus according to further disclosed aspects.

FIG. 2 illustrates a block diagram of an example system 200 according to further aspects of the subject disclosure. System 200 comprises an inter-frequency timing apparatus 202 communicatively coupled with a data store 216. Data store 216 can be as simple as volatile cache memory, or can comprise non-volatile memory (e.g., disk drive, hard drive, compact disc, Flash memory, and so on), or can comprise a database residing on a suitable server. Additionally, it should be appreciated that system 200 can be implemented in a similar manner as inter-frequency timing apparatus 102. For instance, in conjunction with a particular network cell, or a BSC controlling a group of network cells.

Inter-frequency timing apparatus 202 can comprise a communication interface 204 that obtains subframe timing information pertaining to a set of non-serving cells on one or more non-serving frequencies of a wireless network. A set of data processors 206 can execute modules stored in memory 208 to analyze the subframe timing information and generate and forward an information element conveying data about the subframe timing information within a serving cell associated with system 200. Particularly, these modules can comprise a conversion module 210 and a distribution module 212, which can be substantially similar to conversion module 110 and conversion module 114 of FIG. 1, supra.

Further to the above, inter-frequency timing apparatus 202 can comprise a listing module 214. Listing module 214 compiles subframe configuration data for a set of neighboring cells of a wireless network obtained from communication interface 104, on a per-cell or per-frequency basis (e.g., see FIG. 3, infra). Specifically, the set of neighboring cells comprises an inter-frequency cell and at least one other cell of the wireless network. Listing module 214 can parse the compiled subframe configuration data as a function of reporting network cell, or as a function of frequency employed by respective cells, or a suitable combination thereof. Thus, for instance, per-cell timing information can be stored in data store 216 in a per cell timing file 218. Further, per-frequency timing information can be stored in data store 216 in a per frequency timing file 220. In at least one aspect of the subject disclosure, listing module 214 generates a neighbor cell list from the compiled subframe configuration data that comprises a set of IEs. The set of IEs can then each be configured for specifying respective subsets of the compiled subframe configuration data for one of the set of neighboring cells. Alternatively, or in addition, the IEs can each be configured for specifying respective subsets of the compiled subframe configuration data for one of a set of TDD frequencies employed by the wireless network. In a particular aspect thereof, the neighbor cell list can comprise a timing matrix specifying subframe timing information per cell and per TDD frequency of the wireless network (e.g., see FIG. 4, infra). Alternatively, the timing matrix can specify common subframe timing configuration data for all network cells on a particular TDD frequency, except where different subframe timing configuration data is specified for a particular cell of that particular TDD frequency. In any case, the neighbor cell list can be stored in data store 216 in a timing matrix file 222.

Further to the above, distribution module 212 can send the neighbor cell list to one or more access terminals within a serving cell (not depicted) associated with system 200. In one aspect, distribution module 212 sends the neighbor cell list to an access terminal on a measurement configuration unicast channel. In another aspect, distribution module 212 sends the neighbor cell list to the access terminal, or a group of access terminals, on a system information broadcast channel. In a particular aspect, the neighbor cell list can be sent to the group of access terminals on the system information broadcast channel, and particular per-cell or per-frequency subframe timing configuration data can be sent to particular access terminals on the measurement configuration unicast channel, as suitable.

Figure 3:
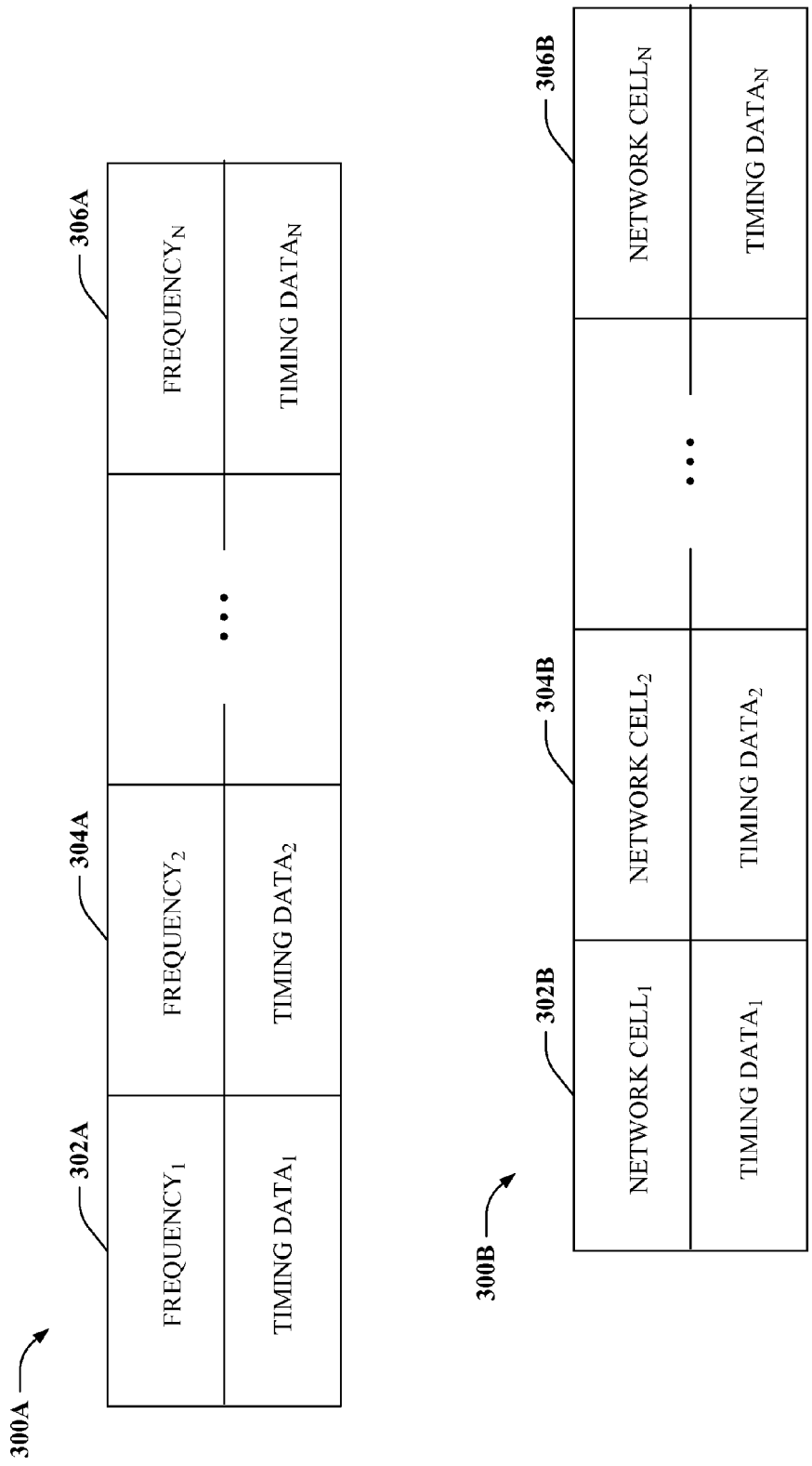
FIG. 3 depicts a block diagram of example per-cell and per-frequency timing records for facilitating inter-frequency timing acquisition.

FIG. 3 illustrates a block diagram of example subframe timing configuration formats 300A, 300B according to aspects of the subject disclosure. A first subframe timing configuration format 300A is provided, comprising timing data configured per-TDD frequency of a wireless network. Particularly, respective TDD frequencies of a set of such frequencies, frequency$_1$ 302A, frequency$_2$ 304A ... frequency$_N$ 306A (collectively referred to as 302A-306A), where N is a positive integer greater than one, are linked with subframe timing data pertaining to such frequencies 302A-306A. In some aspects, the subframe timing data comprises a relationship between a serving frequency and one of the respective TDD frequencies 302A-306A. For instance, the relationship can specify that one of the TDD frequencies 302A-306A utilizes the same subframe timing configuration as the serving frequency, or a different frequency as the serving frequency. As another example, the relationship can specify that all cells on one of the TDD frequencies 302A-306A commonly utilize a different subframe timing configuration as the serving frequency, all cells on the frequency utilize the same subframe timing configuration as the serving frequency, or that cells on the frequency utilize one of a set of subframe timing configurations. As yet another example, respective timing data for the respective TDD frequencies 302A-306A can include a complete subframe timing configuration for cells on that frequency.

A second timing configuration format 300B comprises timing data configured per-cell of the wireless network. Second timing configuration format 300B comprises respective timing data for each of a set of network cells, network cell$_1$ 302B, network cell$_2$ 304B, ..., network cell$_N$ 306B (collectively referred to as 302B-306B). The timing data for the respective network cells 302B-306B can be any of the data formats listed above with respect to TDD frequencies 302A-306A, or another suitable data format for providing information about a subframe timing configuration employed by one or more of the network cells 302B-306B. Particularly, the timing data can be in a format that specifies a complete subframe timing configuration for a network cell (e.g., network cell 302B), in at least one instance. In another instance, the format can specify timing information for network cells (e.g., 304B, 306B) relative to a known subframe timing configuration, a default subframe timing configuration, or a serving subframe timing configuration, or the like, or a suitable combination thereof. In the former case, an access terminal analyzing second timing configuration format 300B can utilize the complete timing configuration specified for network cell 302B and avoid timing measurements completely when decoding signals of that cell. In the latter case, the specified timing information can, on average, reduce a number of timing measurements for decoding signals of network cells 304B, 306B, by indicating some relationship with the known subframe or default subframe timing configuration. Thus, for instance, where timing data indicates that network cells 304B, 306B employ the same timing configuration as the known or default subframe timing configuration, the access terminal can avoid the timing measurements when decoding signals of network cells 304B, 306B. On the other hand, if the timing data indicates that network cell 304B employs the default subframe timing configuration and network cell 306B does not employ the known/default timing configurations, the access terminal can perform the timing measurements for network cell 306B, and avoid timing measurements for network cell 304B, and so on.

Figure 4:
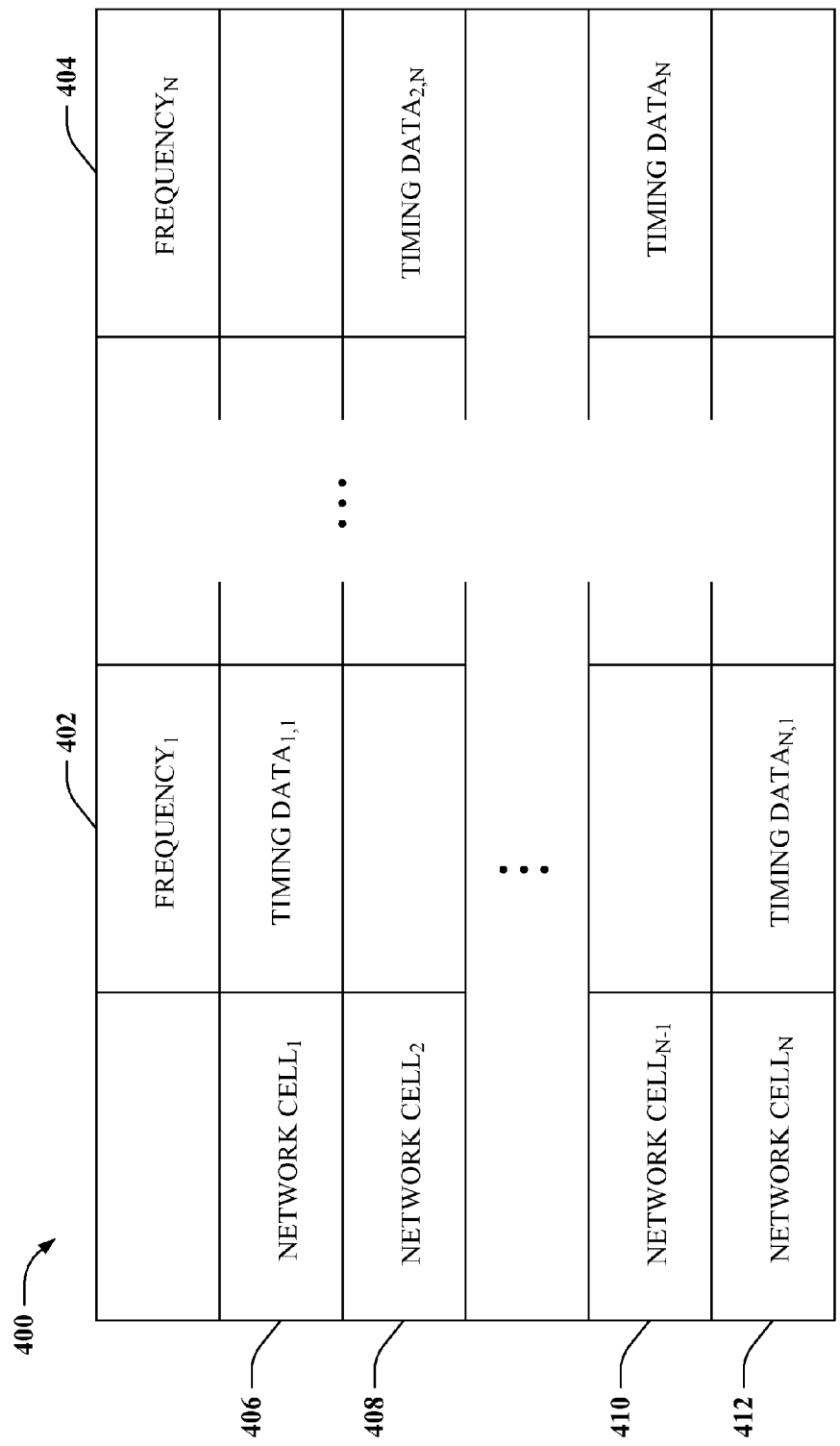
FIG. 4 illustrates a block diagram of an example timing configuration matrix for multi-frequency wireless communication network.

FIG. 4 illustrates a block diagram of an example timing matrix 400 according to further aspects of the subject disclosure. Timing matrix 400 can include timing data for a set of wireless network frequencies, frequency$_1$ 402, . . . , frequency$_N$ 404 (collectively referred to as 402-404), or for a set of wireless network cells, network cell$_1$ 406, network cell$_2$ 408, . . . , network cell$_{N-1}$ 410, network cell$_N$ 412 (collectively referred to as 406-412), or both. In general, timing matrix 400 specifies subframe timing configuration data as described herein. Different formats of timing configuration data can be provided for different network cells 406-412, or different network frequencies 402-404, depending on availability of such data, for instance. In some cases, no data can be specified for a particular wireless frequency 402-404 or network cell 406-412, if no timing configuration data is available, or if such data is corrupt, or the like.

As one particular example, timing matrix 400 comprises a common set of timing data for network cells 406-408 on a first TDD frequency 402. As such, a single set of subframe timing configuration data can be specified for all network cells 406-408 on the first TDD frequency 402 (e.g., timing data$_1$—not depicted). Alternatively, such timing configuration data can be repeated for each network cell 406-408 employing the first TDD frequency 402 (e.g., timing data$_{1,1}$ and timing data$_{N,1}$—as depicted). For a second TDD frequency 404, subframe timing configuration data that is generally common for the second TDD frequency 404 can be specified once for all network cells 410-412 on the second TDD frequency 404 (e.g., timing data$_N$). Network cells on the second TDD frequency 404 that have a different subframe timing configuration than the generally common timing data$_N$ can be individually specified. For instance, network cell$_2$ 408 is associated with timing data$_{2,N}$, which can be different from the generally common timing data$_N$ employed by the second TDD frequency 404. Thus, for second TDD frequency 404, it can be assumed that timing data$_N$ is employed for any network cell 410-412 on such frequency, unless different timing data (e.g., timing data$_{2,N}$) is specified for a particular network cell (e.g., network cell$_2$ 408).

Figure 5:
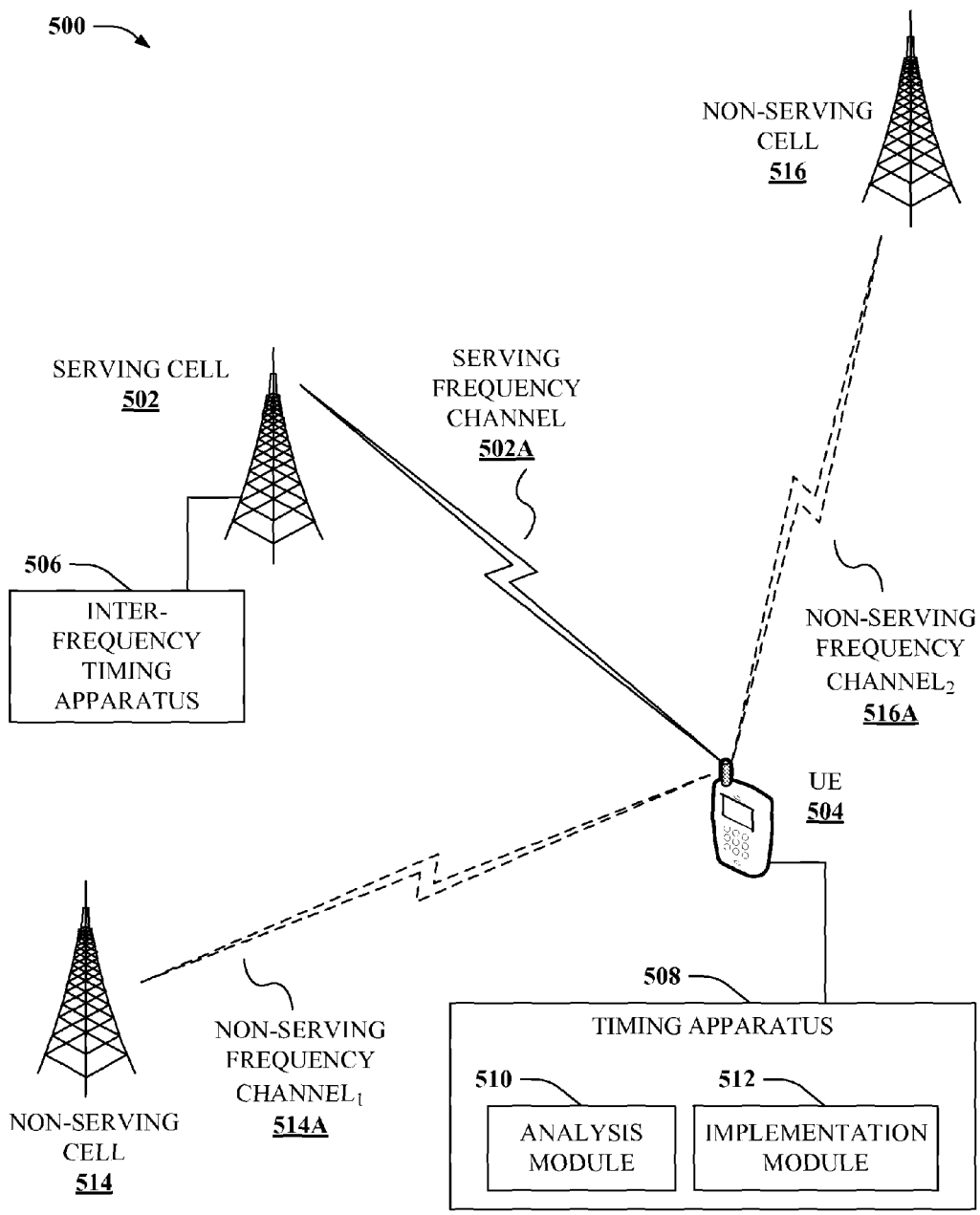
FIG. 5 depicts a block diagram of an example inter-frequency wireless environment according to particular aspects.

FIG. 5 depicts a block diagram of an example multi-frequency wireless environment 500 according to particular aspects of the subject disclosure. Multi-frequency wireless environment 500 comprises user equipment (UE) 504 communicatively coupled with a serving cell 502 via a wireless link formed over a serving frequency channel 502A. Serving frequency channel 502A employs a first TDD frequency of multi-frequency wireless environment 500 (also referred to as a serving frequency). Serving frequency channel 502A enables wireless transmission and reception of data between UE 504 and serving cell 502, including at least control or measurement data pertaining to network timing.

In addition, serving cell 502 is coupled with, or includes, an inter-frequency timing apparatus 506. Inter-frequency timing apparatus 506 can be configured to obtain timing information pertaining to a set of non-serving cells 514, 516. This information can be shared among respective base stations of multi-frequency wireless environment 500 by a backhaul network (not depicted) connecting one or more of the serving cell 502, or non-serving cells 514, 516. The backhaul network can be a wired network or a wireless network, as described herein. Further, this timing information can be parsed per cell or per frequency, and provided to UE 504. In one aspect of the subject disclosure, this provision is broadcast to UE 504 along with other UEs (not depicted) within wireless range of serving cell 502, or is unicast to UE 504 on a unicast channel. As one specific example, inter-frequency timing apparatus 506 can send timing information pertaining to non-serving cells 514, 516 or non-serving frequencies employed by such cells on a system information broadcast channel, or a measurement configuration unicast channel, or a suitable combination thereof.

Non-serving cells 514, 516 can be those network cells of multi-frequency wireless environment 500 that are within wireless range of serving cell 502, or within wireless range of UE 504, that are neighboring serving cell 502, or otherwise pertinent to proper signal decoding at UE 504. Particularly, non-serving cell 514 and non-serving cell 516 employ different wireless network frequencies than the first TDD frequency employed by serving cell 502. For instance, non-serving cell 514 can employ a second TDD frequency, whereas non-serving cell 516 can employ a third TDD frequency.

In typical wireless operation, UE 504 will compare wireless signal strength or quality among nearby wireless base stations in order to identify a strongest or highest quality signal. This comparison is often employed for wireless hand-off determinations from one base station to another, for instance. In addition, UE 504 can often be a mobile communication device, such as a cellular phone, personal digital assistant (PDA), smart phone, or some other portable electronic communication device. Thus, it is not uncommon for UE 504 to be moving within serving cell 502, or between serving cell 502 and one or more non-serving cells 514, 516. Accordingly, signal strength or quality of respective signals can change. UE 504 therefore, can receive wireless signals on the second TDD frequency from non-serving cell 514 over a non-serving frequency channel$_1$ 514A. Likewise, UE 504 can further receive wireless signals on the third TDD frequency from non-serving cell 516 over a non-serving frequency channel$_2$ 516A.

To properly decode received wireless signals, UE 504 can include a timing apparatus 508. Timing apparatus 508 is configured to obtain timing configuration data transmitted by serving cell 502. For instance, timing apparatus 508 can comprise an analysis module 510 that inspects timing data obtained by a wireless communication interface of UE 504 from serving cell 502 of multi-frequency wireless environment 500. Further, analysis module 510 can identify subframe timing configuration data pertaining to a non-serving frequency of multi-frequency wireless environment 500, such as the second TDD frequency or the third TDD frequency. As one example, analysis module 510 can utilize the data to identify a first non-serving subframe timing configuration employed by non-serving cell 514 on the second TDD frequency, or a second subframe timing configuration employed by non-serving cell 516 on the third TDD frequency. (It should be appreciated that the first and second non-serving subframe timing configurations can be the same subframe timing configuration or different subframe timing configurations.) Moreover, timing apparatus 508 can comprise an implementation module 512 that employs a subframe configuration utilized by network cells (e.g., non-serving cells 514, 516) on the non-serving frequency for analyzing signals thereof (e.g., transmitted over non-serving frequency channel₁ 514A or non-serving frequency channel₂ 516A, respectively).

In one aspect of the subject disclosure, inter-frequency timing apparatus 506 can specify the complete non-serving subframe timing configuration(s) within a message sent to UE 504. In such case, the non-serving subframe timing configuration(s) can be used directly in decoding signals received over non-serving frequency channel₁ 514A or non-serving frequency channel₂ 516A. Otherwise, where the timing configuration data instead provides a relationship between a non-serving subframe timing configuration employed by non-serving cell 514 or non-serving cell 516 and a known subframe timing configuration (e.g., a default configuration, a serving subframe timing configuration employed by serving cell 502, or the like), timing apparatus can attempt to infer the non-serving subframe timing configuration(s) from this relationship. If no inference can be made to obtain the non-serving subframe timing configuration, timing apparatus 508 can instead measure signals received over non-serving frequency channel₁ 514A or non-serving frequency channel₂ 516A to obtain the non-serving subframe timing configuration(s) directly. This last option is generally more processor intensive and consumes more electrical power, so is only utilized when the non-serving subframe timing configuration is not specified or inferred from timing data provided by inter-frequency timing apparatus 506.

Figure 6:
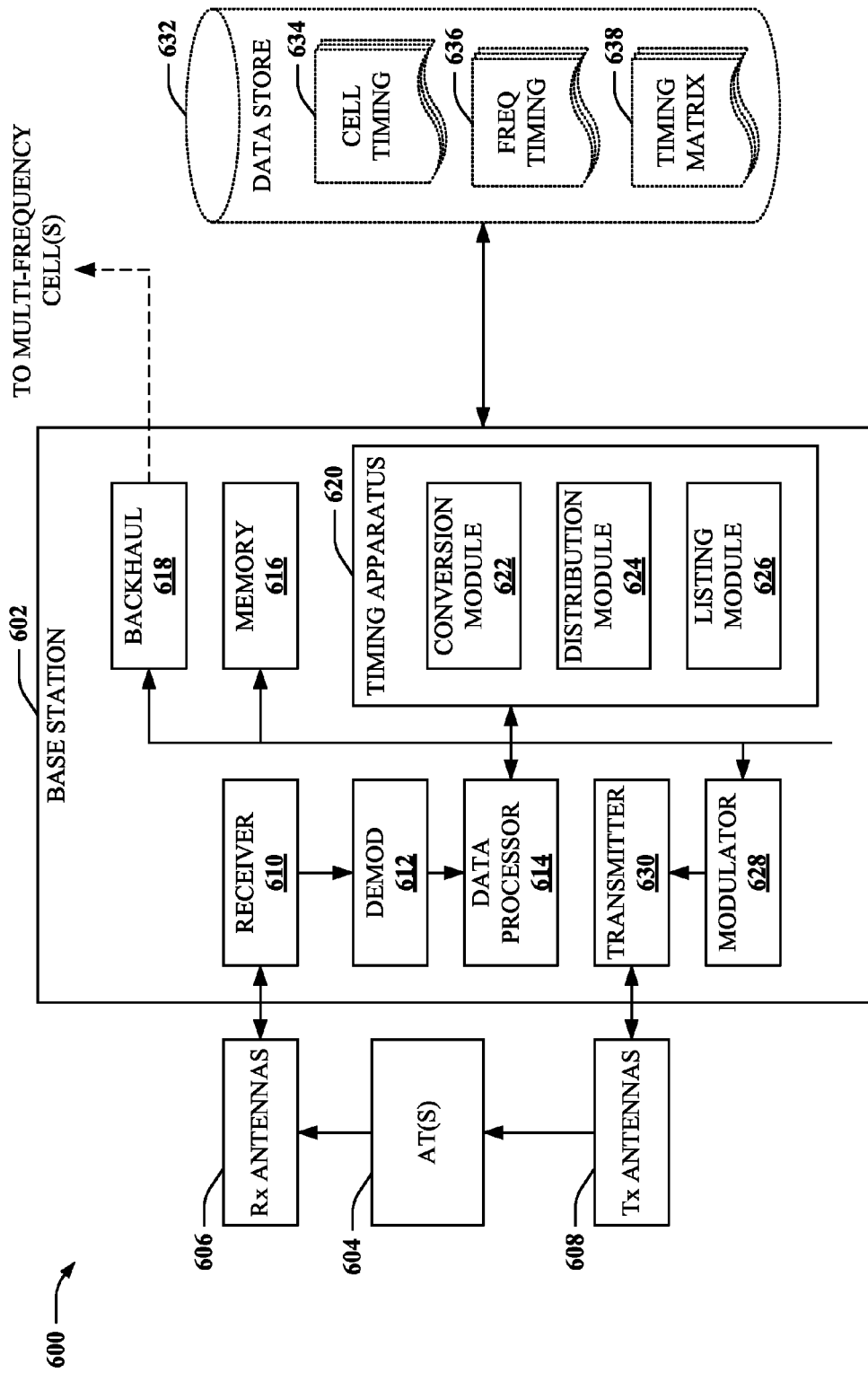
FIG. 6 illustrates a block diagram of a sample base station configured for inter-frequency timing provision according to one or more other aspects.

FIG. 6 illustrates a block diagram of an example system 600 comprising a base station 602 according to particular aspects of the subject disclosure. Base station 602 can be configured to provide improved timing provisioning for access terminals in a wireless network. Particularly, base station 602 can be configured to provide inter-frequency timing data for cells of a wireless network employing different TDD frequencies than that employed by base station 602. By providing improved timing provisioning, base station 602 can reduce power consumption of one or more access terminals (AT(s)) 604 served by base station 602, by reducing a need for direct timing measurements to obtain respective timing configurations for the different TDD frequencies.

Base station 602 (e.g., access point, . . . ) can comprise a receiver 610 that obtains wireless signals from AT(s) 604 through one or more receive antennas 606, and a transmitter 630 that sends coded/modulated wireless signals provided by modulator 628 to the AT(s) 604 through a transmit antenna(s) 608. Receive antenna(s) 606 and transmit antenna(s) 608, along with receiver 610 and transmitter 630, can comprise a communication interface for exchanging data between base station 602 and AT(s) 604. Particularly, the communication interface can be employed to provide control or measurement information, such as inter-frequency subframe timing configuration, to AT(s) 604.

Receiver 610 can obtain information from receive antennas 606 and can further comprise a signal recipient (not shown) that receives uplink data transmitted by AT(s) 604. Additionally, receiver 610 is operatively associated with a demodulator 612 that demodulates received information. Demodulated symbols are analyzed by a data processor 614. Data processor 614 is coupled to a memory 616 that stores information related to functions provided or implemented by base station 602.

Further to the above, base station 602 can comprise a timing apparatus 620 configured to obtain timing data of one or more other base stations of a wireless network (not depicted), and forward the timing data to AT(s) 604. In at least one aspect of the subject disclosure, timing apparatus 620 can be substantially similar to, or include at least in part, inter-frequency timing apparatus 102. Particularly, timing apparatus 620 can employ a backhaul network 618 between base station 602 and the one or more other base stations. Backhaul network 618 can enable base station 602 to share timing configuration data employed by base station 602 on a serving frequency with the one or more other base stations, and receive respective timing configuration data employed by the one or more other base stations on frequencies of the wireless network employed by those base stations.

In at least one aspect of the subject disclosure, timing apparatus 620 can comprise inter-frequency timing apparatus 102. Thus, timing apparatus 620 can employ a communication interface of base station 602 (e.g. backhaul network 618) that obtains subframe timing information employed by an inter-frequency cell in the wireless network. Further, timing apparatus 620 can employ data processor 614 for executing modules configured to update an access terminal (e.g., AT(s) 604) with network timing. Specifically, the modules can comprise a conversion module that generates an IE including information about the subframe timing configuration. Further, the modules can comprise a distribution module for sending the IE to the access terminal by way of a wireless transmitter (e.g., transmitter 630 and transmit antenna(s) 608) employed by base station 602.

According to particular aspects, conversion module 622 can generate the IE in a single-bit format or a multi-bit format. As one example, the single-bit format indicates the subframe timing configuration of one or more inter-frequency cells as the same as or different from a serving subframe configuration employed by base station 602. In other examples, the multi-bit format specifies a complete subframe timing configuration employed by the inter-frequency cell. In yet other examples, the multi-bit format provides a relationship between the subframe timing configuration and a known timing configuration, such as a serving subframe timing configuration, a default subframe timing configuration, or the like. As one specific example, the relationship can specify any one of the following: cells of the wireless network employing a first TDD frequency (e.g., a different frequency than that employed by base station 602) utilize a serving subframe configuration of base station 602, cells of the wireless network employing the first TDD frequency utilize a common subframe configuration, which is different from the serving subframe configuration of base station 602, or that cells of the wireless network employing the first TDD frequency also employ one of various subframe configurations. In the latter case, the various subframe configurations can include the serving subframe configuration, or can exclude the serving subframe configuration.

In other aspects, timing apparatus 620 can comprise a listing module 626. Listing module 626 compiles subframe configuration data for a set of neighboring cells of the wireless network obtained from backhaul network 618. Further, listing module 626 can parse the compiled subframe configuration data on a per-cell or per-frequency basis, wherein the set of neighboring cells comprises at least one inter-frequency cell and at least one other cell. Additionally, the compiled data can be stored by listing module 626 in a data store 632 communicatively coupled with base station 602 for storing subframe configuration data. Data compiled per-cell can be stored in a cell timing file 634, and data compiled per-frequency can be stored in a frequency timing file 636. According to a particular aspect, listing module 626 generates a neighbor cell list from the subframe configuration data that comprises a set of IEs each specifying respective subsets of the subframe configuration data for one of the set of neighboring cells of the wireless network, or for one TDD frequency of the wireless network. The neighbor cell list can be stored in a timing matrix file 638 of data store 632. Furthermore, in this latter aspect, distribution module 624 sends the neighbor cell list to AT(s) 604 on a system information broadcast channel, or a measurement configuration unicast channel, or another suitable broadcast or unicast channel employed by the wireless network.

Figure 7:
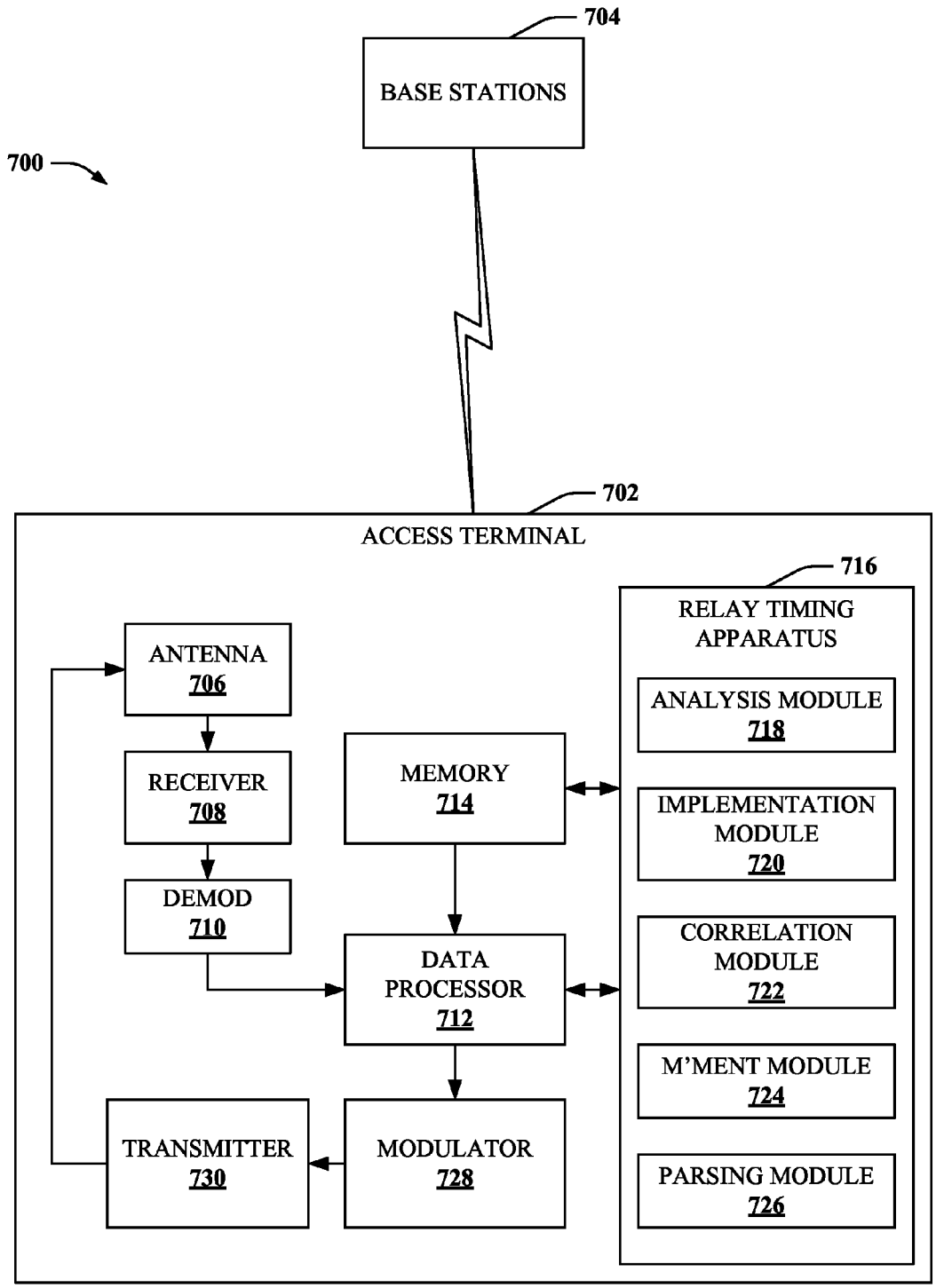
FIG. 7 depicts a block diagram of a sample access terminal configured for inter-frequency timing acquisition according to further aspects.

FIG. 7 depicts a block diagram of an example system comprising an AT 702 configured for wireless communication according to aspects of the subject disclosure. AT 702 can be configured to wirelessly couple with one or more base stations 704 (e.g., access point) of a wireless network. Based on such configuration, AT 702 can receive wireless signals from base station(s) 704 on a forward link channel and respond with wireless signals on a reverse link channel. In addition, AT 702 can comprise instructions stored in memory 714 for analyzing received wireless signals, extracting timing information pertinent to a non-serving cell that employs a different frequency than that of a serving cell, or the like, as described herein.

AT 702 includes at least one antenna 706 (e.g., a wireless transmission/reception interface or group of such interfaces comprising an input/output interface) that receives a signal and receiver(s) 708, which performs typical actions (e.g., filters, amplifies, down-converts, etc.) on the received signal. In general, antenna 706 and a transmitter 730 (collectively referred to as a transceiver) can be configured to facilitate wireless data exchange with base station(s) 704. Further, antenna 706, receiver 708, and transmitter 730, as well as demodulator 710 and modulator 728, can form a wireless communication interface. Particularly, this wireless communication interface can be configured to communicate on multiple TDD frequencies. Thus, in at least one aspect of the subject disclosure, the wireless communication interface employs multiple TDD frequencies of a wireless network to communicate with multiple cells of the wireless network (e.g., including base station(s) 704)).

Antenna 706 and receiver(s) 708 can be coupled with demodulator 710 that can demodulate received symbols and provide such signals to a data processor(s) 712 for evaluation. It should be appreciated that data processor(s) 712 can control and/or reference one or more components (antenna 706, receiver 708, demodulator 710, memory 714, relay timing apparatus 716, analysis module 718, implementation module 720, correlation module 722, signal measurement module 724, parsing module 726, modulator 728, transmitter 730) of the UE 702. Further, data processor(s) 712 can execute one or more modules, applications, engines, or the like (relay timing apparatus 716, analysis module 718, implementation module 720, correlation module 722, signal measurement module 724, parsing module 726) that comprise information or controls pertinent to executing functions of the UE 702. For instance, such functions can include obtaining inter-frequency timing data from a serving cell of base station(s) 704, and employ the data to identify or infer a subframe timing configuration for a non-serving cell of base station(s) 704, or like operations, as described herein.

Additionally, memory 714 of AT 702 is operatively coupled to data processor(s) 712. Memory 714 can store data to be transmitted, received, and the like, and instructions suitable to conduct wireless communication with a remote device. Specifically, the instructions can be utilized to implement the various functions described above, or elsewhere herein. Further, memory 714 can store the modules, applications, engines, etc. (718, 720, 722, 724, 726) executed by data processor(s) 712, above.

Particularly, AT 702 comprises a relay timing apparatus 716 for extracting timing data received from the serving cell and employing the timing data to obtain the subframe timing configuration for the non-serving cell. For instance, relay timing apparatus 716 can utilize the wireless communication interface that employs multiple TDD frequencies to communicate with multiple cells of a wireless network. Relay timing apparatus 716 can further employ at least one data processor 712 to execute modules (e.g., stored in memory 714) configured to obtain network timing configurations for these multiple cells. These modules can include an analysis module 718 that inspects timing data obtained by the wireless communication interface from the serving cell to identify subframe configuration data pertaining to a non-serving frequency of the wireless network. Additionally, relay timing apparatus 716 can comprise an implementation module that employs a subframe configuration utilized by network cells on the non-serving frequency for analyzing signals thereof. This subframe configuration can be derived either from a correlation module 722, or a signal measurement module 724, depending on what information is included in the subframe configuration data received at analysis module 718, as described below.

Correlation module 722 can be employed by relay timing apparatus 716, and one of: identifies a subset of the timing data pertaining to the non-serving frequency and determines or infers the subframe configuration from the subset of the timing data or determines from the subset of the timing data that signals of the non-serving frequency must be measured to obtain the subframe configuration. Thus, in one example, correlation module 722 can determine that the subset of the timing data specifies the subframe configuration is the same or not the same as a known subframe configuration employed by relay timing apparatus 716 (e.g., a serving subframe timing configuration, a default subframe timing configuration, or the like, stored in memory 714). In another example, correlation module 722 can determine that the subset of the timing data specifies the subframe configuration is any one of the following: the same as a serving subframe configuration and commonly employed by network cells on the non-serving frequency, different from the serving subframe configuration and commonly employed by the network cells on the non-serving frequency or is but one of a set of subframe configurations employed by the network cells on the non-serving frequency.

In these examples, the timing data provides a relationship between the subframe configuration employed for the non-serving frequency and a known subframe configuration. Based on an analysis of the timing data, relay timing apparatus 716 can infer the subframe configuration employed for the non-serving frequency. Thus, for instance, correlation module 722 determines the serving subframe configuration is employed by the non-serving frequency, if the subframe configuration is the same as the serving subframe configuration. As another case, correlation module 722 instructs relay timing apparatus 716 to measure signals of the non-serving frequency to obtain the subframe configuration, and impute the subframe configuration to all network cells on the non-serving frequency, if the subframe configuration is different from the serving subframe configuration and commonly employed by network cells on the non-serving frequency. In yet another case, correlation module 722 infers that signals of respective cells on the non-serving frequency must be independently measured to obtain respective subframe configurations of the set of subframe configurations for each such cell, if the subframe configuration is but one of the set of subframe configurations employed by the network cells on the non-serving frequency.

In an alternate example to the above, however, the subset of the timing data specifies a complete subframe configuration for the non-serving frequency or a network cell on the non-serving frequency. In this case, correlation module 722 can extract a complete subframe timing configuration employed for the non-serving frequency, which can be directly implemented by implementation module 720. Where no complete subframe configuration is provided, or no suitable relationship to a known configuration that can be utilized to infer the subframe configuration employed by the non-serving frequency, relay timing apparatus 716 can employ a signal measurement module 724 that directly evaluates signals of a network cell on the non-serving frequency to derive the subframe configuration.

According to one or more additional aspects of the subject disclosure, relay timing apparatus 716 can comprise a parsing module 726. Parsing module 726 sorts the timing data into respective subsets thereof pertaining to respective ones of multiple TDD frequencies of the wireless network. As a more particular example, parsing module 726 can parse timing data pertaining to a first non-serving frequency into a first subset of the timing data, parse timing data pertaining to a second non-serving frequency into a second subset of the timing data, and so on. Parsing module 726 can save respective subsets of timing data in memory 714. In these aspects of the subject disclosure, analysis module 718 can be configured to inspect respective subsets of timing data to identify respective subframe configuration data pertaining to the respective ones of the multiple TDD frequencies of the wireless network. This subset-by-subset analysis can facilitate obtaining different subframe timing configurations for different network frequencies, or different network cells on respective frequencies, and so forth.

The aforementioned systems have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include AT 702, base station 602, data store 216, and non-serving cells 514 and 516, or a different combination of these or other modules. Sub-modules could also be implemented as modules communicatively coupled to other modules rather than included within parent modules. Additionally, it should be noted that one or more modules could be combined into a single module providing aggregate functionality. For instance, conversion module 210 can include distribution module 212, or vice versa, to generate an IE that includes subframe timing information and to forward the IE to access terminals served by a wireless network, by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 8:
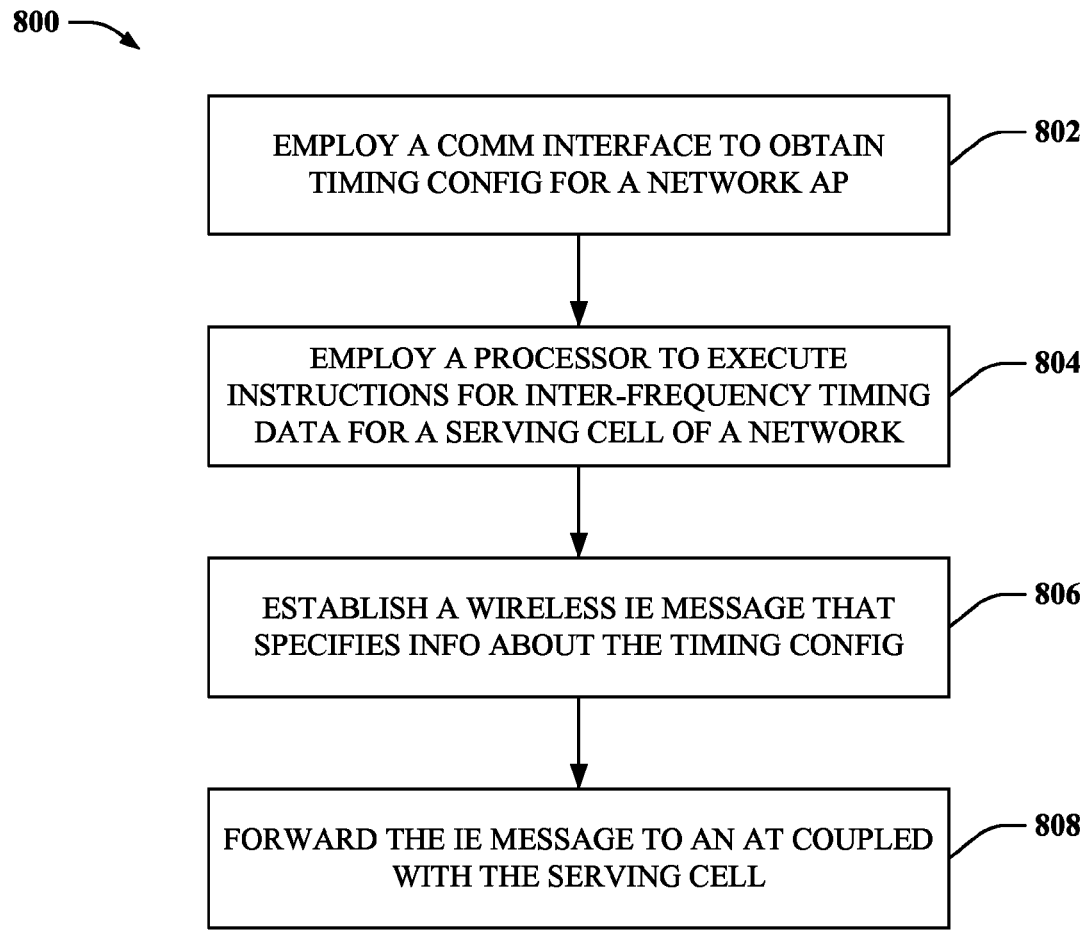
FIG. 8 illustrates a flowchart of an example methodology for inter-frequency timing provisioning in wireless communications.

FIG. 8 illustrates a flowchart of an example methodology 800 for providing improved timing in multi-frequency wireless networks according to aspects of the subject disclosure. At 802, method 800 can comprise employing a communication interface to obtain a time division duplex (TDD) timing configuration for an access point of a wireless network on a first TDD frequency. The TDD timing configuration can be obtained via a backhaul network with the access point, or over-the-air (OTA) (e.g., on an air interface utilizing a TDD frequency) via one or more access terminals. In the former case, the backhaul network can be a wired network, or a wireless network that communicatively couples the access point with a serving base station associated with the communication interface.

At 804, method 800 can comprise employing a data processor to execute instructions configured to provide inter-frequency TDD timing data for a serving cell of the wireless network (comprising the serving base station) on a second TDD frequency. It should be appreciated that the first TDD frequency and the second TDD frequency can be distinct frequencies employed by a wireless network (e.g., a 3GPP LTE TDD network). At 806, executing the instructions can comprise establishing an IE (e.g., a network message) comprising one or more fields that specify information about the TDD timing configuration. In one aspect, method 800 can further comprise identifying the first TDD frequency with the IE. This provides an explicit correlation between the first TDD frequency and the information about the TDD timing configuration. Particular aspects of the subject disclosure provide for employing a single bit data format or a multi-bit data format for the IE. As one example, the single bit format indicates the access point employs the same or a different subframe configuration as the serving cell. As another example, the multi-bit data format specifies any one of the following: the TDD timing configuration of the access point is identical to a subframe configuration employed by the serving cell, cells of the wireless network employing the first TDD frequency also employ the TDD timing configuration, or cells of the wireless network employing the first TDD frequency also employ one of a set of TDD timing configurations which includes the TDD timing configuration. In a separate example, however, the multi-bit format can facilitate specifying a complete subframe configuration of the TDD timing configuration with the IE.

At 808, executing the instructions can further comprise forwarding the IE on a wireless air interface utilizing the second TDD frequency for delivery to one or more access terminals. The access terminals can be within the serving cell, and can be idle or actively connected with the serving cell. In one instance, forwarding the IE to the access terminal can further comprise employing dedicated signaling or broadcast signaling. For instance, dedicated signaling can be employed for an access terminal that is actively connected to the serving cell, whereas broadcast signaling can be employed for idle access terminals. However, the subject disclosure is not so limited.

As one particular example, method 800 can comprise obtaining and forwarding subframe configuration data for one or more cells neighboring the serving cell (e.g., where neighboring refers to those cells that are specified as neighboring cells, or those cells that are in signaling range of the serving cell, or the like). Alternatively, method 800 can comprise obtaining and forwarding subframe configuration data that is parsed per-cell or per-frequency, or a suitable combination thereof. Thus, for instance, method 800 can comprise obtaining and forwarding subframe configuration data for a plurality of TDD frequencies employed by cells neighboring the serving cell. In a more specific example, method 800 comprises generating and forwarding a neighboring cell list that specifies subframe configuration data for each cell in signaling range of the serving cell, on a per TDD frequency basis.

In addition to the foregoing, method 800 can further comprise obtaining an additional TDD timing configuration of a second access point of the wireless network, wherein the second access point employs a third TDD frequency, different from the first TDD frequency and the second TDD frequency. Additionally, in such aspect(s), method 800 can comprise specifying the additional TDD timing configuration in the IE or into a second IE dedicated for the second access point or the third TDD frequency. Further to the above, method 800 can comprise forwarding the second IE or the IE specifying the additional TDD timing configuration to the access terminal in such aspects as well.

Figure 9:
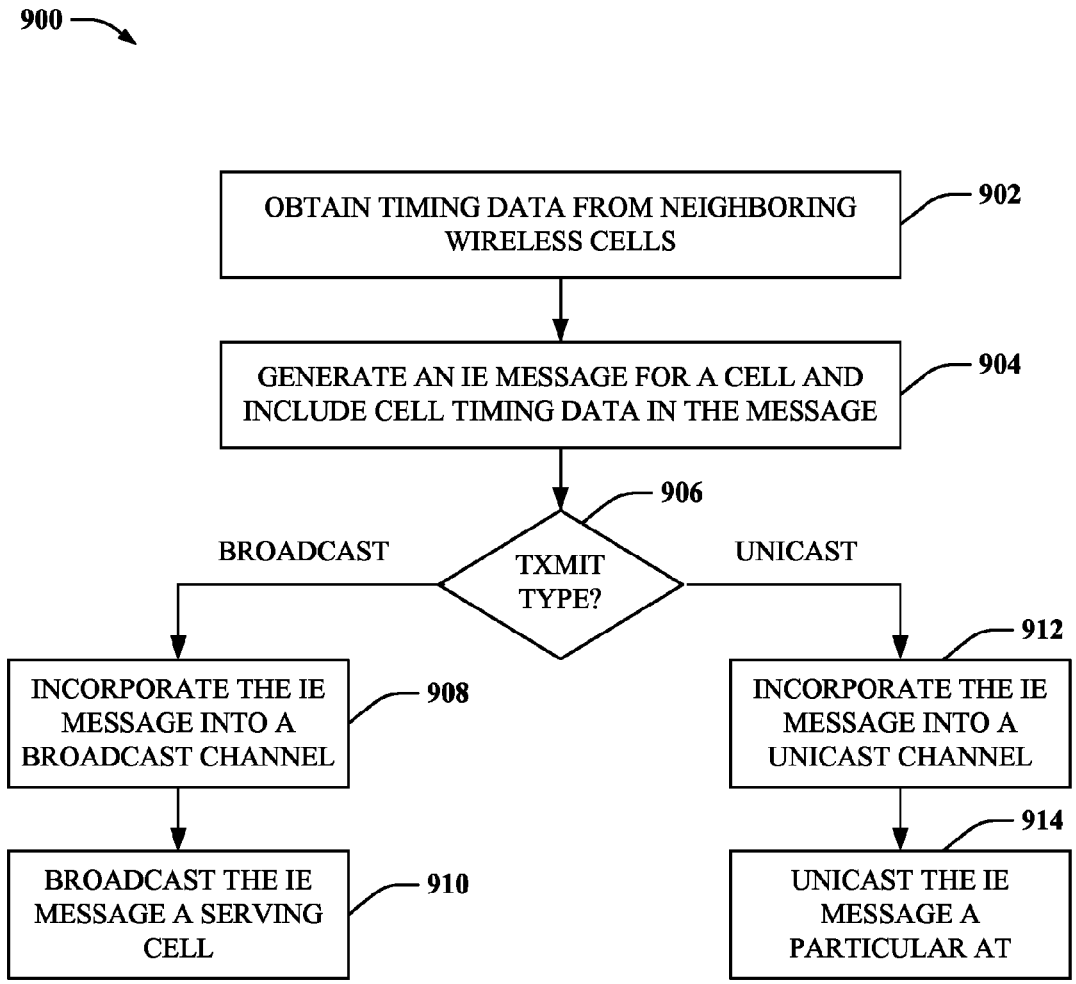
FIG. 9 depicts a flowchart of a sample methodology for facilitating inter-frequency timing acquisition according to still other aspects.

FIG. 9 depicts a flowchart of an example methodology 900 for improved timing provisioning of inter-frequency network cells in wireless communication. At 902, method 900 can comprise obtaining timing data from neighboring wireless cells in a wireless network, where at least one of the neighboring wireless cells employs a different frequency than a serving cell. At 904, method 900 can comprise generating an IE for a network cell and including cell timing data in the IE, as described herein (e.g., see FIG. 8, supra). Further, at 906, method 900 can comprise determining whether unicast or broadcast signaling is employed for forwarding the IE to access terminals within the serving cell. For broadcast signaling, method 900 can proceed to 908. Otherwise, method 900 proceeds to 912.

At 908, method 900 can comprise incorporating the IE into a broadcast channel. Further, at 910, method 900 can comprise broadcasting the IE within a serving cell of the wireless network. At 912, method 900 instead comprises incorporating the IE into a unicast message. At 914, method 900 can comprise unicasting the IE to a particular AT within the wireless network.

Figure 10:
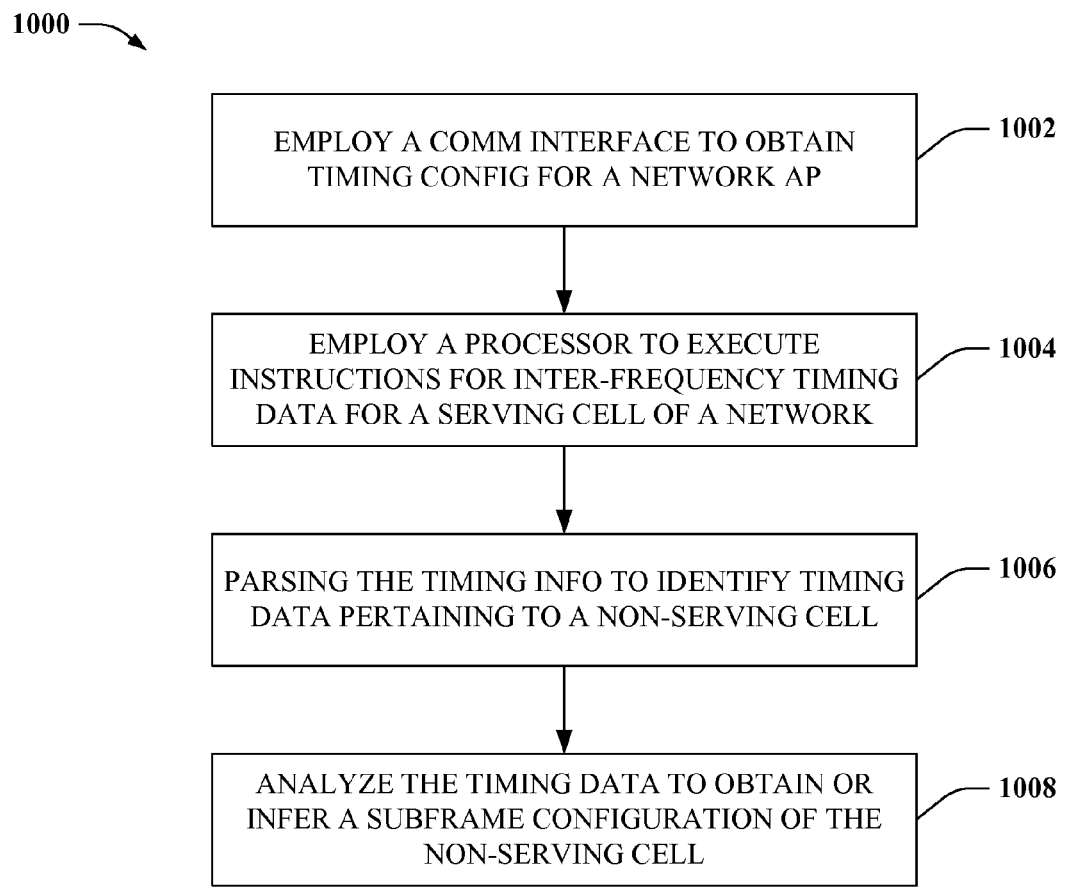
FIG. 10 depicts a flowchart of a sample methodology for acquiring timing configurations in a multi-frequency wireless environment.

FIG. 10 depicts a flowchart of an example methodology 1000 according to further aspects of the subject disclosure. At 1002, method 1000 can comprise employing a wireless communication interface to obtain timing information pertaining to multiple frequencies of a wireless network. The timing information can comprise an explicit subframe timing configuration employed by a network cell, or a relationship between the subframe timing configuration and a known timing configuration. At 1004, method 1000 can comprise employing a data processor to execute instructions configured to determine inter-frequency timing data for cells of the wireless network.

At 1006, executing the instructions can further comprise parsing the timing information to identify timing data pertaining to a non-serving cell of the wireless network. In at least one aspect of method 1000, parsing the timing information further comprises identifying whether the subframe configuration is the same as or different from a serving subframe configuration employed by a serving cell of the wireless network. In still other aspects of method 1000, parsing the timing information further comprises identifying any one of: cells of the wireless network on a non-serving frequency (non-serving network cells) utilize a serving subframe configuration of a serving frequency, the non-serving network cells utilize a common subframe configuration that is different from the serving subframe configuration, or the non-serving network cells utilize one of a set of multiple different subframe configurations.

Further to the above, executing the instructions can comprise, at 1008, analyzing the timing data to obtain or infer a subframe configuration of the non-serving cell. Based on the subframe configuration, one or more actions can be determined and implemented by method 1000. In one example, a suitable action can comprise employing the serving subframe configuration for signal analysis of the non-serving cell, if such cell utilizes the serving subframe configuration (e.g., the subframe configuration is the same as the serving subframe configuration). In another case, a suitable action can comprise analyzing signals of the non-serving cell to obtain a measured subframe configuration for the non-serving frequency, and imputing the measured subframe configuration to all of the non-serving network cells, if the non-serving network cells utilize the common subframe configuration. In yet another case, a suitable action can comprise independently analyzing signals of the non-serving cell to identify which of the set of multiple different subframe configurations is employed by the non-serving cell, if the non-serving network cells utilize one of the set of multiple different subframe configurations. Where the subframe configuration is not within or cannot be inferred from the timing data, method 1000 can instead comprise measuring wireless signals of the non-serving cell to obtain the subframe configuration if the subframe configuration.

As one particular format, the timing data pertaining to the multiple frequencies of the wireless network can comprise a neighboring cell list that provides subframe configuration information per cell or per frequency of the wireless network. Optionally, the neighboring cell list specifies both a per frequency subframe configuration list and a per cell subframe configuration list. For this latter implementation, method 1000 can optionally comprise associating a per frequency subframe configuration to all non-serving cells employing a particular frequency indicated in the per frequency subframe configuration list, except those non-serving cells employing the particular frequency that have a per cell subframe configuration indicated in the per cell subframe configuration list that is different from the per frequency subframe configuration. Said differently, a common per-frequency timing can be specified for all network cells on a first non-serving frequency, except for those network cells on the first non-serving frequency that are associated with different per-cell timing information. In this case, a particular per-cell timing configuration entry can be provided for a cell that does not utilize the common per-frequency timing, to distinguish those cells that do utilize such timing (e.g., see FIG. 4, supra).

Figure 11:
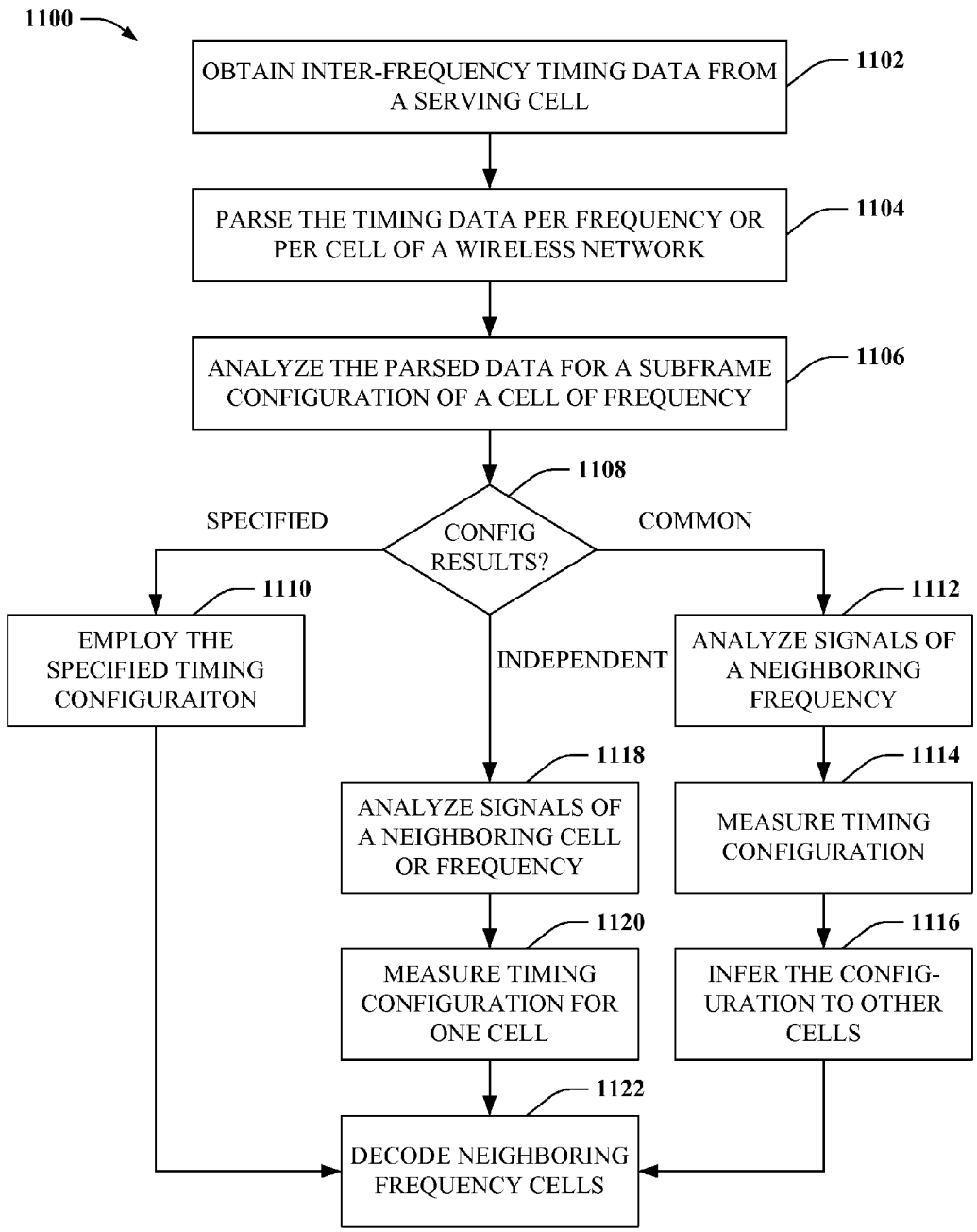
FIG. 11 illustrates a flowchart of an example methodology for simplifying inter-frequency timing acquisition according to further aspects.

FIG. 11 depicts a flowchart of an example methodology 1100 for employing inter-frequency timing data in wireless communications. At 1102, method 1100 can comprise obtaining inter-frequency timing data from a serving cell of a wireless network. The inter-frequency timing data can comprise, for instance, a subframe configuration of a non-serving cell of the wireless network, or data pertaining to the subframe configuration of the non-serving cell.

Further to the above, at 1104, method 1100 can comprise parsing the timing data per frequency or per cell of the wireless network. At 1106, method 1100 can comprise analyzing the parsed data for a subframe configuration of a particular cell or frequency of the wireless network. At 1108, a determination is made as to the whether the subframe timing is fully specified by the timing data, or whether a common yet unknown subframe timing is employed for cells of the non-serving frequency, or whether independent subframe timing configurations are employed by network cells of the non-serving frequency.

Method 1100 proceeds to 1110 if the subframe timing is fully specified as a result of the analysis at reference number 1106. In such case, method 1100 can employ the specified timing configuration for the non-serving cell. Further, method 1100 can proceed to 1122, where neighboring frequency cells are decoded with the specified timing configuration.

Method 1100 proceeds to 1112 if the subframe timing is common to network cells on the non-serving frequency, but is different from the serving subframe timing configuration. Thus, at 1112, method 1100 can analyze signals of one neighboring cell on the non-serving frequency. At 1114, method 1100 can measure the subframe timing from the analyzed signals. At 1116, method 1100 can impute the measured subframe timing to other cells of the non-serving frequency. Furthermore, method 1100 can proceed to 1122 where the neighboring frequency cells are decoded with the measured subframe timing configuration.

If the determination at 1108 indicates that network cells on the non-serving frequency employ various subframe timing configurations, method 1100 proceeds to 1118. At 1118, signals of the neighboring cell or frequency are analyzed. At 1120, method 1100 can measure the timing configuration for one cell of the non-serving frequency. Further, at 1122, method 1100 can then decode signals of the one cell of the non-serving frequency.

Figure 12:
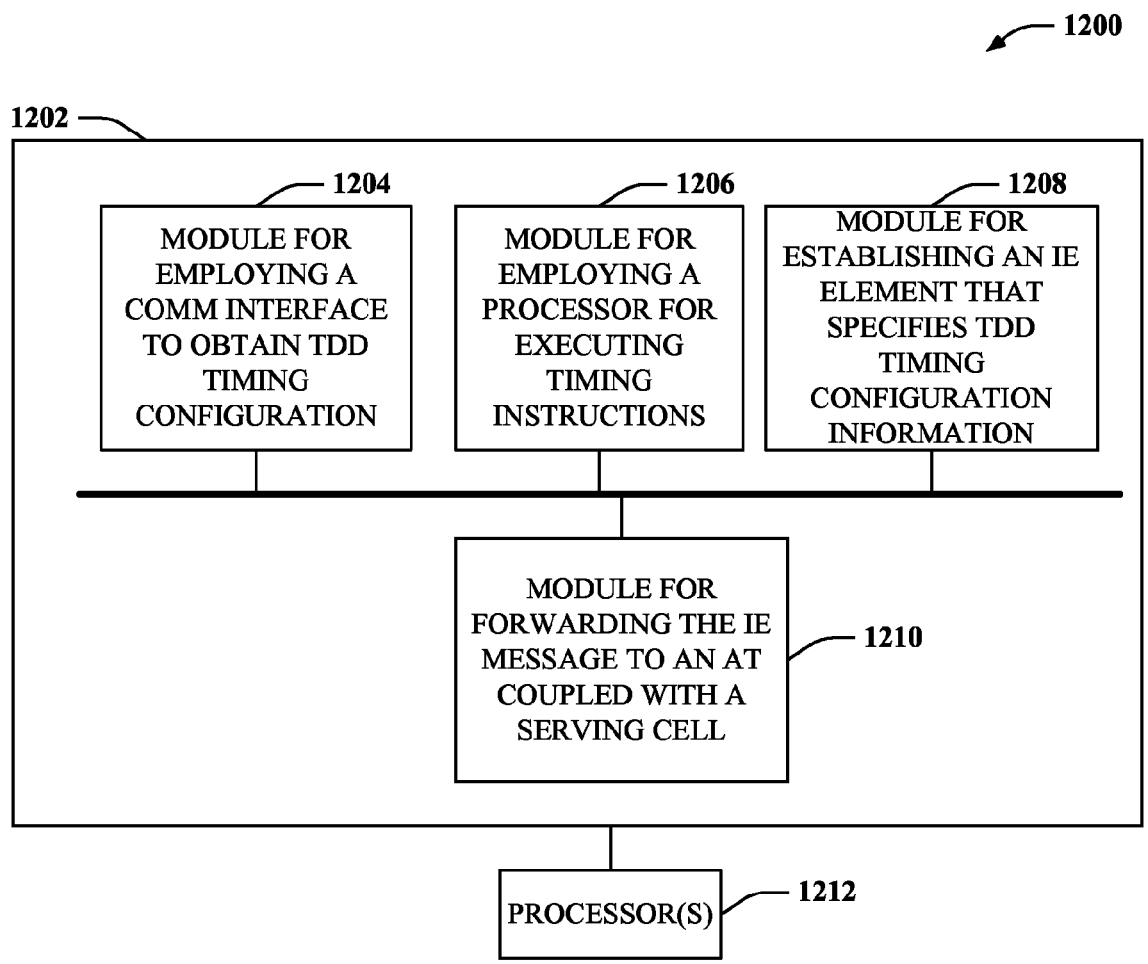
FIGS. 12 and 13 depict block diagrams of electronic or computer processing devices for facilitating and implementing timing acquisition, respectively.
Figure 13:
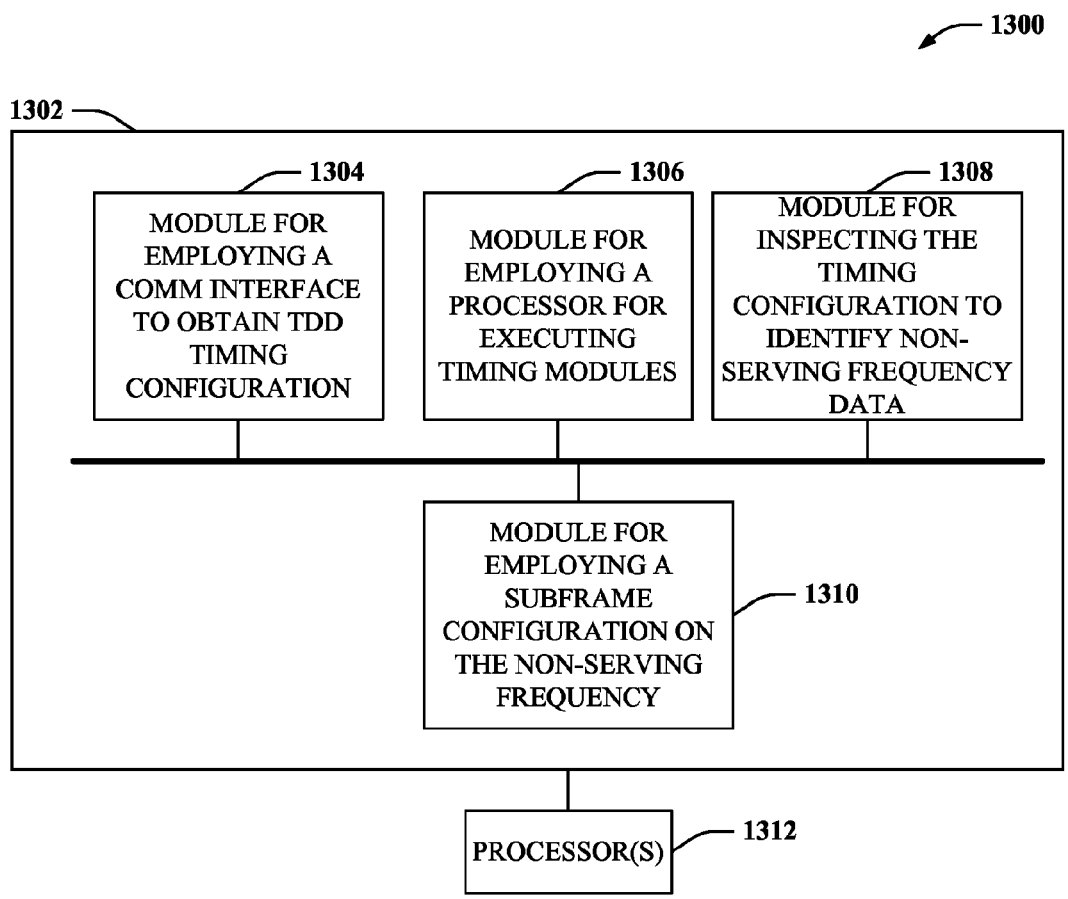

FIGS. 12 and 13 illustrate respective example systems 1200, 1300 for implementing improved inter-frequency timing provisioning in wireless communications according to aspects of the subject disclosure. For instance, systems 1200, 1300 can reside at least partially within a wireless communication network and/or within a wireless receiver such as a node, base station, access point, user terminal, personal computer coupled with a mobile interface card, or the like. It is to be appreciated that systems 1200, 1300 are represented as including functional blocks, which can be functional blocks that represent functions implemented by a processor, software, or combination thereof (e.g., firmware).

System 1200 can comprise memory 1202 for storing modules configured to execute functions of system 1200. Particularly, system 1200 comprises a module 1204 for employing a communication interface to obtain a TDD timing configuration for an access point of the wireless network on a first TDD frequency. Further, system 1200 can comprise a module 1206 for employing a data processor to execute additional program modules configured to provide inter-frequency TDD timing data via a serving cell of the wireless network on a second TDD frequency. For instance, a module 1208 can be employed for establishing an IE comprising a set of message fields that specifies information about the TDD timing configuration. The IE can be in one of various permitted formats. Examples include a single-bit format, or a multi-bit format. In at least one aspect, the IE specifies whether the inter-frequency TDD timing data is the same as or different from other timing data that is known to an access terminal communicatively coupled with the serving cell. In such case, the access terminal can avoid additional signal measurements on the first TDD frequency to obtain the inter-frequency TDD timing data. In another aspect, the IE can specify whether one or more cells on the first TDD frequency share common timing data, and whether the common timing data is the same as or different from the known timing data. In this aspect, the IE can at least reduce a likelihood that the access terminal will have to perform the timing measurements. Further to the above, system 1200 can further comprise a module 1210 for forwarding the IE to the access terminal.

System 1300 can comprise memory 1302 for storing modules configured to execute functions of system 1300. Particularly, system 1300 can comprise a module 1304 for employing a wireless communication interface to obtain timing information pertaining to a non-serving frequency of a wireless network. In addition, system 1300 can comprise a module 1306 for employing a data processor to execute program modules configured to determine inter-frequency timing data for cells of the wireless network. These program modules can include a module 1308 for inspecting the timing information to identify subframe configuration data pertaining to the non-serving frequency, as well as a module 1310 for employing a subframe configuration utilized by network cells on the non-serving frequency for analyzing signals thereof, as described herein.

Figure 14:
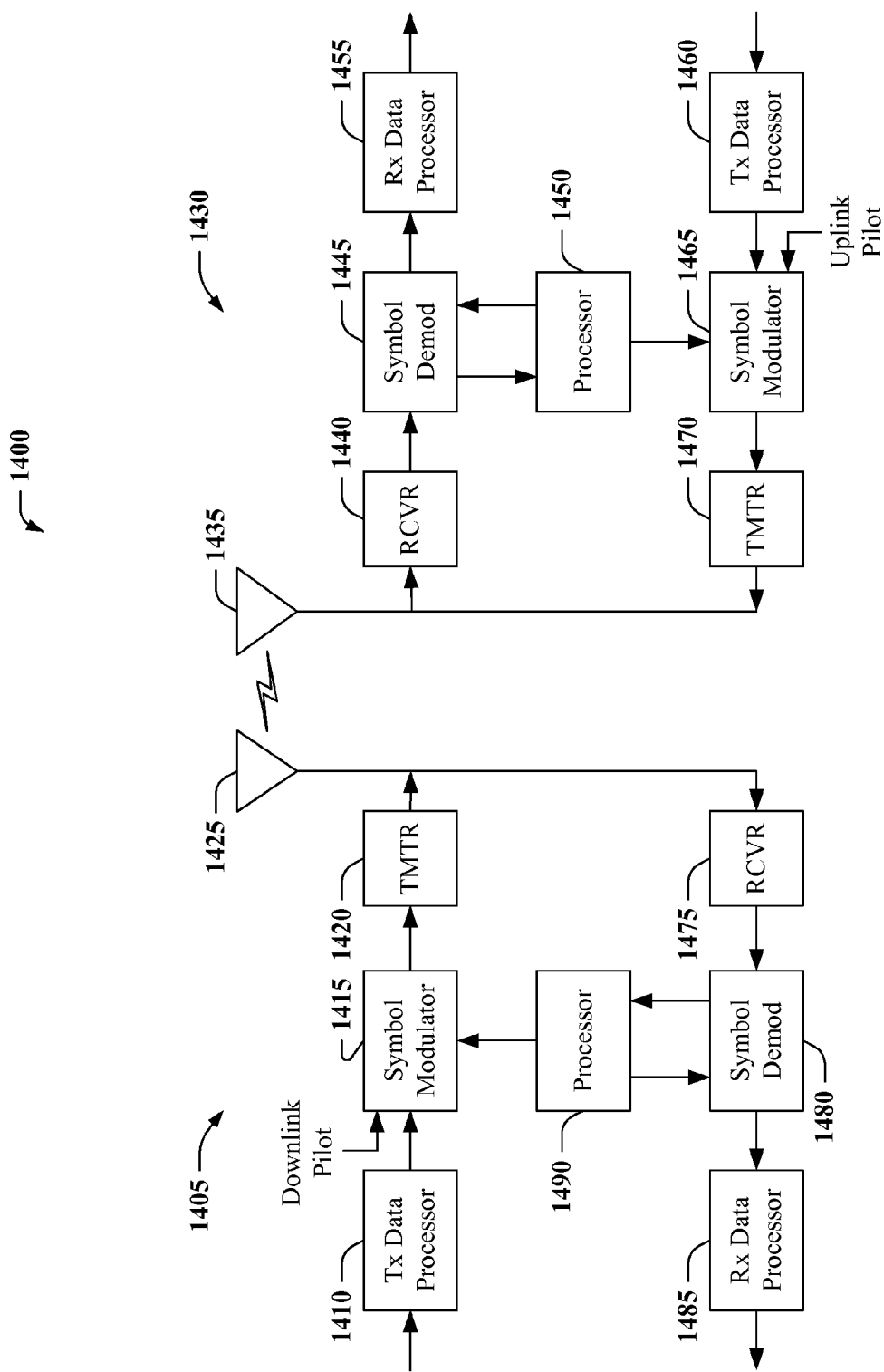
FIG. 14 depicts a block diagram of a sample wireless communications apparatus employed in implementing various aspects of the subject disclosure.

FIG. 14 depicts a block diagram of an example system 1400 that can facilitate wireless communication according to some aspects disclosed herein. On a downlink, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. A symbol modulator 1415 multiplexes data and pilot symbols and provides them to a transmitter unit (TMTR) 1420. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1420 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1425 to the terminals. At terminal 1430, an antenna 1435 receives the downlink signal and provides a received signal to a receiver unit (RCVR) 1440. Receiver unit 1440 conditions (e.g., filters, amplifies, and frequency downconverts) the received signal and digitizes the conditioned signal to obtain samples. A symbol demodulator 1445 demodulates and provides received pilot symbols to a processor 1450 for channel estimation. Symbol demodulator 1445 further receives a frequency response estimate for the downlink from processor 1450, performs data demodulation on the received data symbols to obtain data symbol estimates (which are estimates of the transmitted data symbols), and provides the data symbol estimates to an RX data processor 1455, which demodulates (i.e., symbol demaps), deinterleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the uplink, a TX data processor 1460 processes traffic data and provides data symbols. A symbol modulator 1465 receives and multiplexes the data symbols with pilot symbols, performs modulation, and provides a stream of symbols. A transmitter unit 1470 then receives and processes the stream of symbols to generate an uplink signal, which is transmitted by the antenna 1435 to the access point 1405. Specifically, the uplink signal can be in accordance with SC-FDMA requirements and can include frequency hopping mechanisms as described herein.

At access point 1405, the uplink signal from terminal 1430 is received by the antenna 1425 and processed by a receiver unit 1475 to obtain samples. A symbol demodulator 1480 then processes the samples and provides received pilot symbols and data symbol estimates for the uplink. An RX data processor 1485 processes the data symbol estimates to recover the traffic data transmitted by terminal 1430. A processor 1490 performs channel estimation for each active terminal transmitting on the uplink. Multiple terminals can transmit pilot concurrently on the uplink on their respective assigned sets of pilot sub-bands, where the pilot sub-band sets can be interlaced.

Processors 1490 and 1450 direct (e.g., control, coordinate, manage, etc.) operation at access point 1405 and terminal 1430, respectively. Respective processors 1490 and 1450 can be associated with memory units (not shown) that store program codes and data. Processors 1490 and 1450 can also perform computations to derive frequency and time-based impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1490 and 1450.

Figure 15:
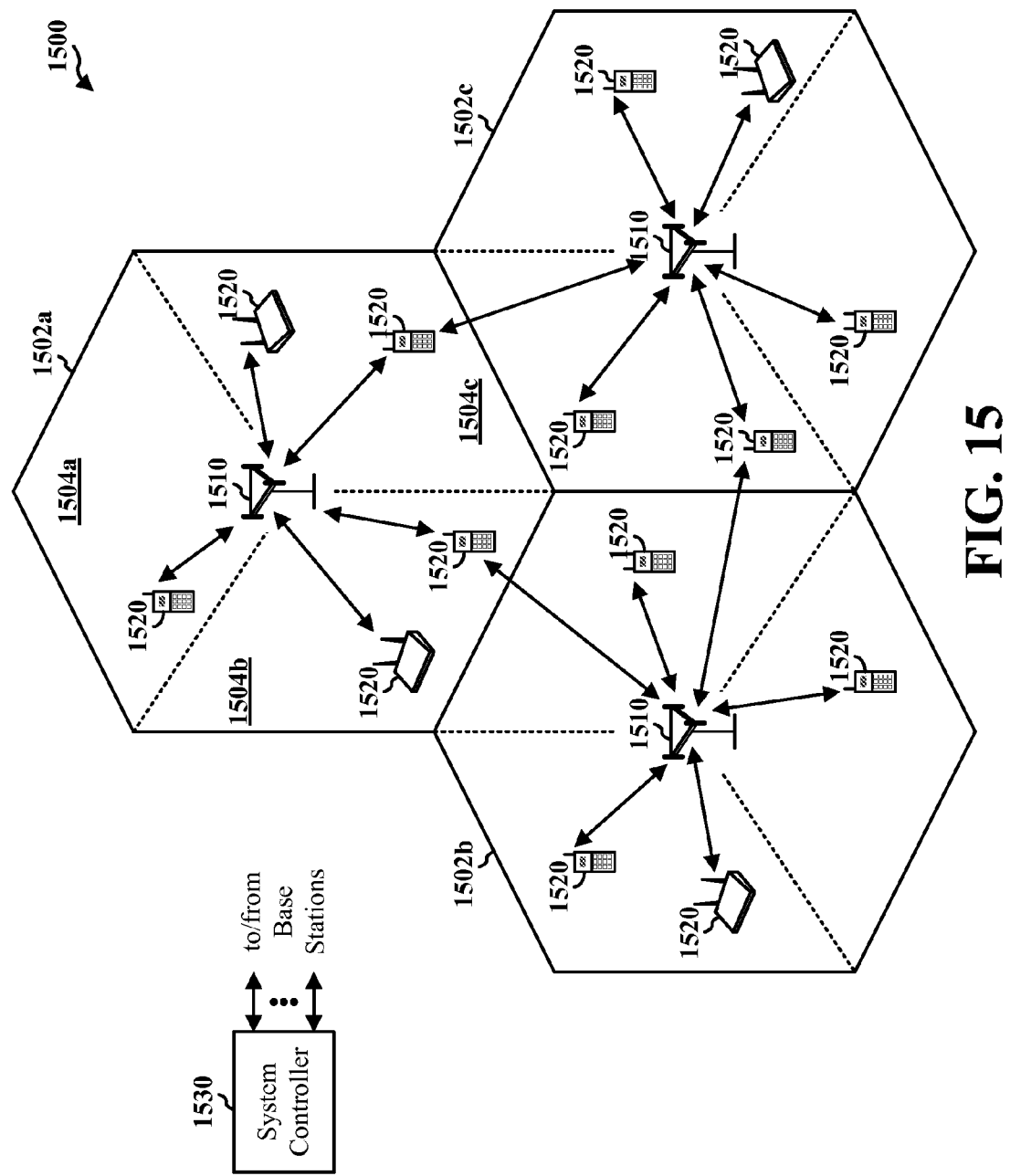
FIG. 15 illustrates a block diagram of an example cellular environment for wireless communications according to further aspects.

FIG. 15 illustrates a wireless communication system 1500 with multiple base stations (BSs) 1510 (e.g., wireless access points, wireless communication apparatus) and multiple terminals 1520 (e.g., ATs), such as can be utilized in conjunction with one or more aspects. A BS 1510 is generally a fixed station that communicates with the terminals and can also be called an access point, a Node B, or some other terminology. Each BS 1510 provides communication coverage for a particular geographic area or coverage area, illustrated as three geographic areas in FIG. 15, labeled 1502a, 1502b, and 1502c. The term "cell" can refer to a BS or its coverage area depending on the context in which the term is used. To improve system capacity, a BS geographic area/coverage area can be partitioned into multiple smaller areas (e.g., three smaller areas, according to cell 1502a in FIG. 15), 1504a, 1504b, and 1504c. Each smaller area (1504a, 1504b, 1504c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1520 are typically dispersed throughout the system, and each terminal 1520 can be fixed or mobile. Terminals 1520 can also be called a mobile station, user equipment, a user device, wireless communication apparatus, an access terminal, a user terminal or some other terminology. A terminal 1520 can be a wireless device, a cellular phone, a personal digital assistant (PDA), a wireless modem card, and so on. Each terminal 1520 can communicate with zero, one, or multiple BSs 1510 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1530 couples to base stations 1510 and provides coordination and control for BSs 1510. For a distributed architecture, BSs 1510 can communicate with one another as needed (e.g., by way of a wired or wireless backhaul network communicatively coupling the BSs 1510). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 16:
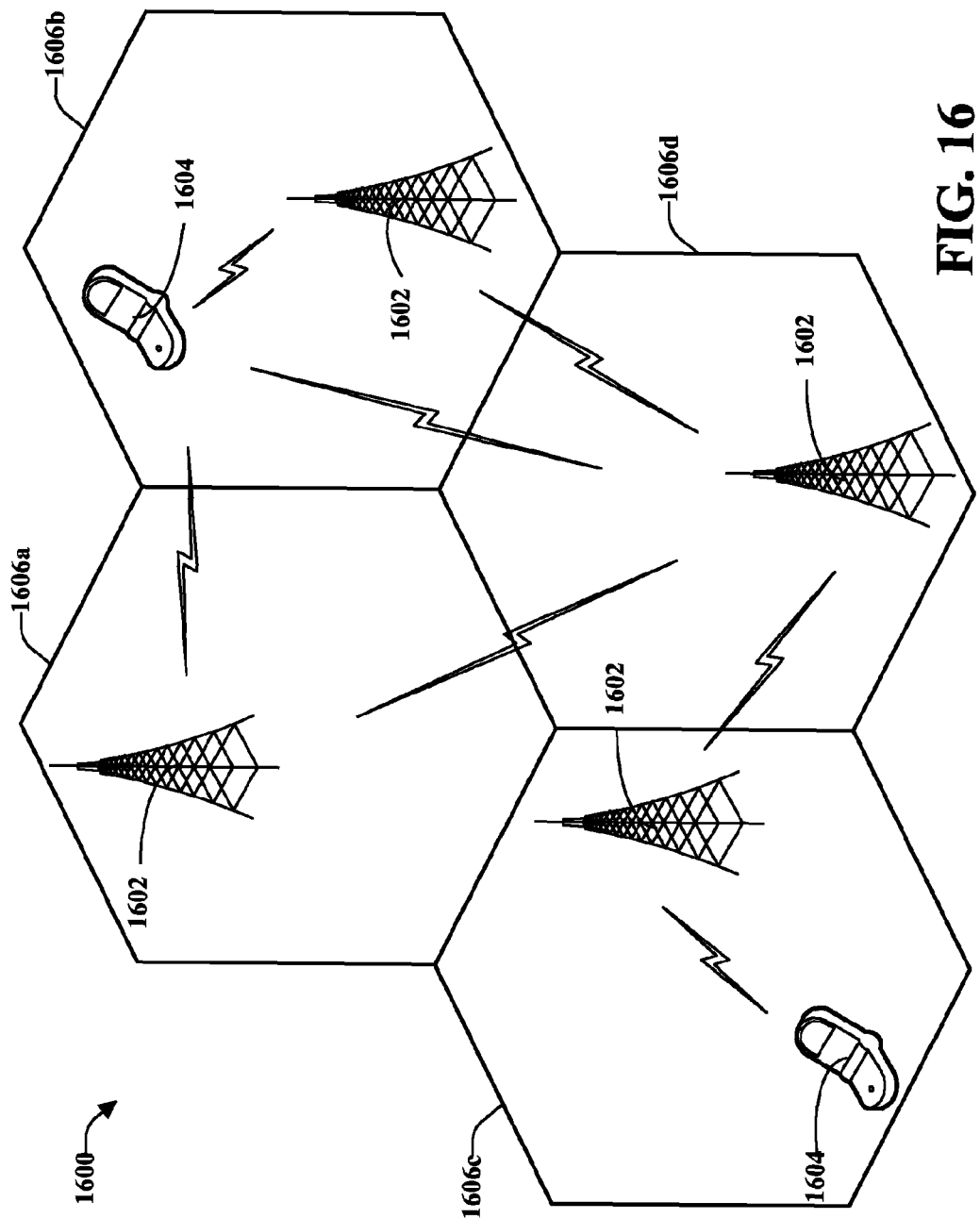
FIG. 16 depicts a block diagram of an example wireless signaling environment for wireless communications.

FIG. 16 is an illustration of a planned or semi-planned wireless communication environment 1600, in accordance with various aspects. Wireless communication environment 1600 can comprise one or more BSs 1602 in one or more cells and/or sectors that receive, transmit, repeat, etc., wireless communication signals to each other and/or to one or more mobile devices 1604. As illustrated, each BS 1602 can provide communication coverage for a particular geographic area, illustrated as four geographic areas, labeled 1606a, 1606b, 1606c and 1606d. Each BS 1602 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 14, supra), as will be appreciated by one skilled in the art. Mobile devices 1604 can be, for example, cellular phones, smart phones, laptops, handheld communication devices, handheld computing devices, satellite radios, global positioning systems, PDAs, or any other suitable device for communicating over wireless communication environment 1600. Wireless communication environment 1600 can be employed in conjunction with various aspects described herein in order to facilitate improved timing management in wireless communications, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user equipment (UE). A UE can also be called a system, a subscriber unit, a subscriber station, mobile station, mobile, mobile communication device, mobile device, remote station, remote terminal, access terminal (AT), user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of wireless communication, comprising:
obtaining, at a serving cell of a wireless network, a time division duplex (TDD) subframe timing configuration for an access point of the wireless network on a first TDD frequency; and
providing inter-frequency TDD subframe timing data via the serving cell of the wireless network on a second TDD frequency, comprising:
establishing an information element comprising one or more message fields that specify information about the TDD subframe timing configuration;
forwarding the information element on a wireless air interface utilizing the second TDD frequency for delivery to one or more access terminals.

2. The method of claim 1, further comprising identifying the first TDD frequency with the information element.

3. The method of claim 1, further comprising employing a single bit data format or a multi-bit data format for the information element.

4. The method of claim 3, wherein the single bit data format indicates the access point employs the same or a different subframe configuration as the serving cell.

5. The method of claim 3, wherein the multi-bit data format specifies any one of the following:
the TDD subframe timing configuration of the access point is identical to a TDD subframe timing configuration employed by the serving cell;
cells of the wireless network employing the first TDD frequency also employ the TDD subframe timing configuration; or
cells of the wireless network employing the first TDD frequency also employ one of a set of TDD subframe timing configurations which includes the TDD subframe timing configuration.

6. The method of claim 1, further comprising obtaining and forwarding TDD subframe configuration data for one or more cells neighboring the serving cell.

7. The method of claim 1, further comprising obtaining and forwarding TDD subframe configuration data for a plurality of TDD frequencies employed by cells neighboring the serving cell.

8. The method of claim 1, further comprising generating and forwarding a neighboring cell list that specifies TDD subframe configuration data for each cell neighboring the serving cell on a per TDD frequency basis.

9. The method of claim 1, further comprising specifying a complete subframe configuration of the TDD subframe timing configuration with the information element.

10. The method of claim 1, wherein forwarding the information element further comprises at least one of:
employing dedicated signaling for forwarding the information element to the one or more access terminals actively connected to the serving cell; or
employing broadcast signaling for forwarding the information element to any access terminal receiving signaling messages from the serving cell.

11. The method of claim 1, further comprising:
obtaining an additional TDD subframe timing configuration of a second access point of the wireless network, wherein the second access point employs a third TDD frequency, different from the first TDD frequency and the second TDD frequency;
specifying the additional TDD subframe timing configuration in the information element, or in a second information element dedicated for the second access point or the third TDD frequency; and
forwarding a message containing the information element or the second information element over the second TDD frequency to the one or more access terminals.

12. An apparatus for wireless communication, comprising:
a communication interface configured to obtain a time-division duplex (TDD) subframe timing configuration of an inter-frequency cell of a wireless network operating at a different TDD frequency from a cell associated with the apparatus;
a data processor for executing modules configured to update an access terminal with network timing, the modules comprising:
a conversion module configured to generate an information element comprising one or more message fields for including information about the TDD subframe timing configuration;
a distribution module configured to send the information element over an air interface to the access terminal by way of a wireless transmitter employed by the apparatus; and
memory configured to store the modules.

13. The apparatus of claim 12, wherein the communication interface is coupled to a backhaul network between a base station associated with the apparatus and the inter-frequency cell.

14. The apparatus of claim 13, wherein the backhaul network is a wired electronic communication network or a wireless electronic communication network communicatively coupling the inter-frequency cell and the base station.

15. The apparatus of claim 12, wherein the information element is in a single-bit format or a multi-bit format.

16. The apparatus of claim 15, wherein the single-bit format indicates that the TDD subframe timing configuration is the same as or different from a serving subframe configuration employed by a serving cell.

17. The apparatus of claim 15, wherein the multi-bit format specifies a complete TDD subframe timing configuration employed by the inter-frequency cell.

18. The apparatus of claim 15, wherein the inter-frequency cell employs a first TDD frequency, and a serving cell that serves the access terminal and is associated with the apparatus employs a second TDD frequency, and further wherein the multi-bit format specifies any one of the following:
cells of the wireless network employing the first TDD frequency utilize a serving TDD subframe configuration of the serving cell;

cells of the wireless network employing the first TDD frequency utilize a common TDD subframe configuration, which is different from the serving subframe configuration; or cells of the wireless network employing the first TDD frequency also employ one of various TDD subframe configurations.

19. The apparatus of claim 12, further comprising a listing module configured to compile TDD subframe configuration data for a set of neighboring cells of the wireless network obtained from the communication interface on a per-cell or per-frequency basis, wherein the set of neighboring cells comprises the inter-frequency cell and at least one other cell.

20. The apparatus of claim 19, further comprising a data store communicatively coupled with the apparatus and configured to store subframe configuration data compiled by the listing module.

21. The apparatus of claim 19, wherein the listing module is configured to generate a neighbor cell list from the TDD subframe configuration data that comprises a set of information elements specifying respective subsets of the TDD subframe configuration data for one of the set of neighboring cells of the wireless network or for one TDD frequency of the wireless network, or a combination thereof.

22. The apparatus of claim 21, wherein the distribution module is configured to send the neighbor cell list to the access terminal on a system information broadcast channel or a measurement configuration unicast channel.

23. An apparatus configured for wireless communication, comprising:
  means for obtaining, at a serving cell of a wireless network, a time division duplex (TDD) subframe timing configuration for an access point of the wireless network on a first TDD frequency; and
  means for providing inter-frequency TDD subframe timing data via the serving cell of the wireless network on a second TDD frequency, comprising:
    means for establishing an information element (IE) comprising a set of message fields that specifies information about the TDD subframe timing configuration;
    means for forwarding the information element utilizing the second TDD frequency to an access terminal within the serving cell.

24. At least one processor configured for wireless communication, comprising:
  a module configured to obtain a time division duplex (TDD) subframe timing configuration for an access point of a wireless network on a first TDD frequency; and
  a module configured to establish an information element (IE) comprising a set of message fields that specifies information about the TDD subframe timing configuration;
  a module configured to forward the information element to an access terminal within a serving cell of the wireless network on a second TDD frequency.

25. A computer program product, comprising:
  a computer-readable non-transitory medium, comprising:
    code for causing a computer to obtain a time division duplex (TDD) subframe timing configuration for an access point of a wireless network on a first TDD frequency; and
    code for causing the computer to establish an information element (IE) comprising a set of message fields that specifies information about the TDD subframe timing configuration;
    code for causing the computer to forward the information element to an access terminal within a serving cell of the wireless network on a second TDD frequency.

26. A method of engaging in wireless communications, comprising:
  obtaining timing information pertaining to multiple frequencies of a wireless network; and
  determining inter-frequency subframe timing data for cells of the wireless network, comprising:
    parsing the timing information to identify timing data pertaining to a non-serving cell of the wireless network; and
    analyzing the timing data to obtain or infer a subframe configuration of the non-serving cell.

27. The method of claim 26, wherein obtaining the timing information further comprises measuring wireless signals of the non-serving cell to obtain the subframe configuration if the subframe configuration is not within or cannot be inferred from the timing data.

28. The method of claim 26, wherein parsing the timing information further comprises identifying whether the subframe configuration is the same as or different from a serving subframe configuration employed by a serving cell of the wireless network.

29. The method of claim 28, further comprising employing the serving subframe configuration for signal analysis of the non-serving cell if the subframe configuration is the same as the serving subframe configuration.

30. The method of claim 26, wherein parsing the timing information further comprises identifying any one of the following conditions:
  one or more cells of the wireless network on a non-serving frequency (non-serving network cells) utilize a serving subframe configuration of a serving frequency;
  one or more non-serving network cells utilize a common subframe configuration that is different from the serving subframe configuration; or
  one or more non-serving network cells utilize one of a set of multiple different subframe configurations.

31. The method of claim 30, further comprising employing the serving subframe configuration for signal analysis of at least one of the non-serving network cells if such cell utilizes the serving subframe configuration.

32. The method of claim 30, further comprising analyzing signals of at least one of the non-serving network cells to obtain a measured subframe configuration for the non-serving frequency, and imputing the measured subframe configuration to all of the non-serving network cells, if the one or more non-serving network cells utilize the common subframe configuration.

33. The method of claim 30, further comprising independently analyzing signals of at least one of the non-serving cells to identify which of the set of multiple different subframe configurations is employed by the at least one non-serving network cell, if the one or more non-serving network cells utilize one of the set of multiple different subframe configurations.

34. The method of claim 26, wherein the timing information comprises a neighboring cell list that provides subframe configuration information per cell or per frequency of the wireless network.

35. The method of claim 34, wherein the neighboring cell list specifies both a per frequency subframe configuration list and a per cell subframe configuration list.

36. The method of claim 35, further comprising associating a per frequency subframe configuration to all non-serving cells employing a particular frequency indicated in the per frequency subframe configuration list, except those non-serving cells employing the particular frequency that have a per cell subframe configuration indicated in the per cell subframe configuration list that is different from the per frequency subframe configuration.

37. An apparatus configured for engaging in wireless communication, comprising:
  a wireless communication interface configured to support communication using multiple time-division duplex (TDD frequencies of a wireless network and to communicate with multiple cells of the wireless network;
  memory arranged to store modules configured to obtain network timing configurations; and
  at least one data processor configured to execute the modules, the modules comprising:
    an analysis module configured to inspect timing data obtained by the wireless communication interface from a serving cell of the wireless network to identify TDD subframe configuration data pertaining to a non-serving frequency of the wireless network; and
    an implementation module configured to employ a TDD subframe configuration utilized by network cells on the non-serving frequency for analyzing signals thereof.

38. The apparatus of claim 37, further comprising a correlation module configured to perform one of:
  identifying a subset of the timing data pertaining to the non-serving frequency and determining or inferring the TDD subframe configuration from the subset of the timing data; or
  determining from the subset of the timing data that signals of the non-serving frequency must be measured to obtain the TDD subframe configuration.

39. The apparatus of claim 38, wherein the subset of the timing data specifies that the TDD subframe configuration is the same or is not the same as a known TDD subframe configuration employed by the apparatus.

40. The apparatus of claim 38, wherein the subset of the timing data specifies the TDD subframe configuration is any one of the following:
  the same as a serving TDD subframe configuration and commonly employed by network cells on the non-serving frequency
  different from the serving TDD subframe configuration and commonly employed by the network cells on the non-serving frequency; or
  is but one of a set of TDD subframe configurations employed by the network cells on the non-serving frequency.

41. The apparatus of claim 40, wherein the correlation module is configured to determine that the serving TDD subframe configuration is employed by the non-serving frequency, if the TDD subframe configuration is the same as the serving TDD subframe configuration.

42. The apparatus of claim 40, wherein the correlation module is configured to instruct the apparatus to measure signals of the non-serving frequency to obtain the TDD subframe configuration, and is configured to impute the TDD subframe configuration to all network cells on the non-serving frequency, if the TDD subframe configuration is different from the serving TDD subframe configuration and commonly employed by network cells on the non-serving frequency.

43. The apparatus of claim 40, wherein the correlation module is configured to infer that signals of respective cells on the non-serving frequency must be independently measured to obtain respective TDD subframe configurations of the set of TDD subframe configurations for each such cell, if the TDD subframe configuration is but one of the set of TDD subframe configurations employed by the network cells on the non-serving frequency.

44. The apparatus of claim 38, wherein the subset of the timing data specifies a complete TDD subframe configuration for the non-serving frequency or a network cell on the non-serving frequency.

45. The apparatus of claim 37, further comprising a signal measurement module configured to directly evaluate signals of a network cell on the non-serving frequency to derive the TDD subframe configuration.

46. The apparatus of claim 37, further comprising a parsing module configured to sort the timing data into respective subsets thereof pertaining to respective ones of the multiple TDD frequencies of the wireless network.

47. The apparatus of claim 46, wherein the analysis module is configured to inspect respective subsets of timing data to identify respective TDD subframe configuration data pertaining to the respective ones of the multiple TDD frequencies of the wireless network.

48. An apparatus for participating in wireless communication, comprising:
  means for obtaining timing information pertaining to a non-serving frequency of a wireless network; and
  means for determining inter-frequency timing data for cells of the wireless network, comprising:
    means for inspecting the timing information to identify subframe configuration data pertaining to the non-serving frequency; and
    means for employing a subframe configuration utilized by network cells on the non-serving frequency for analyzing signals thereof.

49. At least one processor for participating in wireless communication, comprising:
  a module for obtaining timing information pertaining to a non-serving frequency of a wireless network;
  a module for inspecting the timing information to identify subframe configuration data pertaining to the non-serving frequency; and
  a module for employing a subframe configuration utilized by network cells on the non-serving frequency for analyzing signals thereof.

50. A computer program product, comprising:
  a computer-readable non-transitory medium, comprising:
    code for causing a computer to obtain timing information pertaining to a non-serving frequency of a wireless network;
    code for causing the computer to inspect the timing information to identify subframe configuration data pertaining to the non-serving frequency; and
    code for causing the computer to employ a subframe configuration utilized by network cells on the non-serving frequency for analyzing signals thereof.

* * * * *